June 18, 1946.   F. H. BOGART   2,402,273
MACHINE TOOL HAVING A TORQUE MEASURING DEVICE
Filed Sept. 18, 1941   9 Sheets-Sheet 1
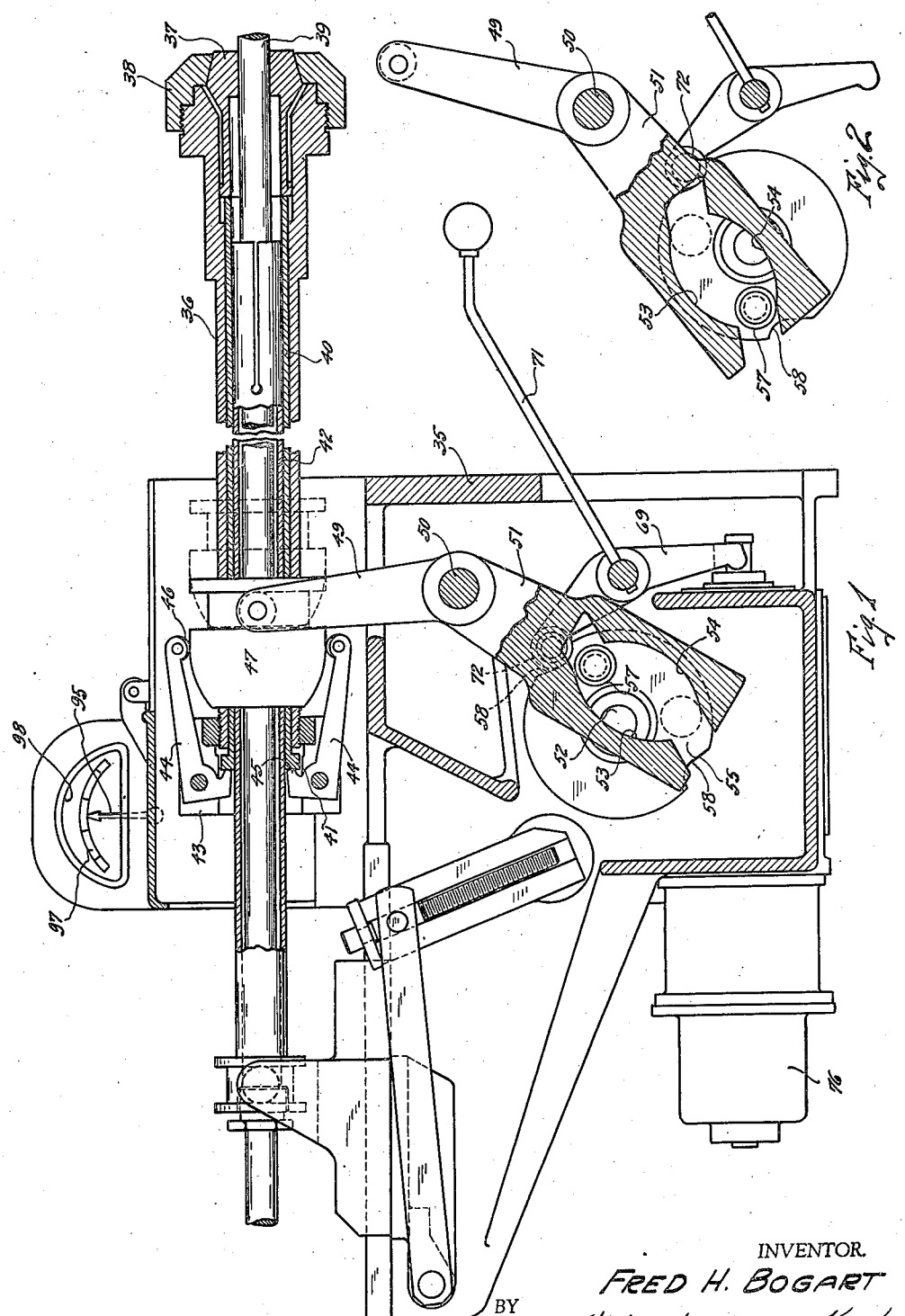
INVENTOR.
FRED H. BOGART
BY
Kwis Hudson & Kent
ATTORNEYS June 18, 1946. F. H. BOGART 2,402,273
MACHINE TOOL HAVING A TORQUE MEASURING DEVICE
Filed Sept. 18, 1941 9 Sheets-Sheet 2
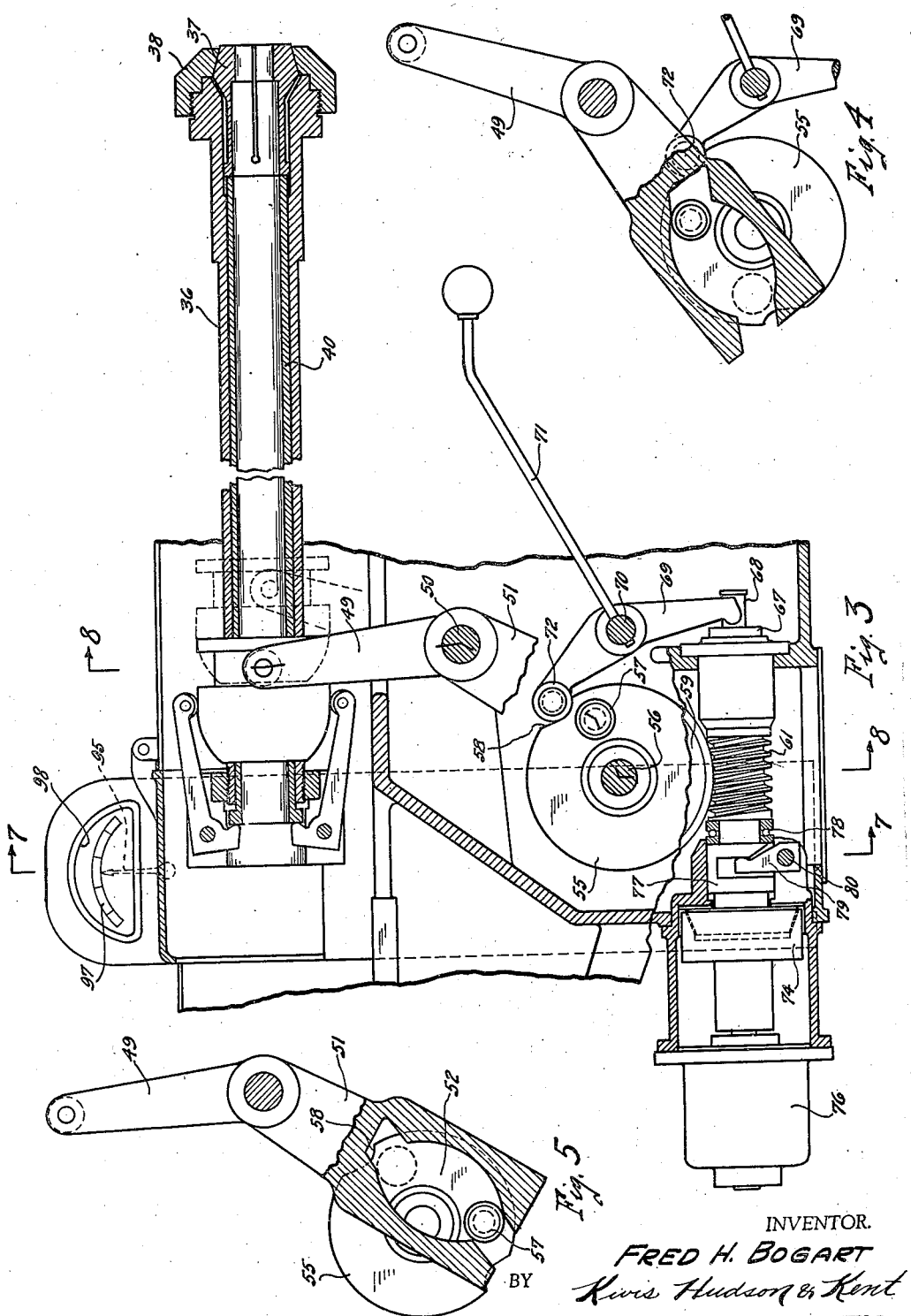
INVENTOR.
FRED H. BOGART
BY Kivis Hudson & Kent
ATTORNEYS

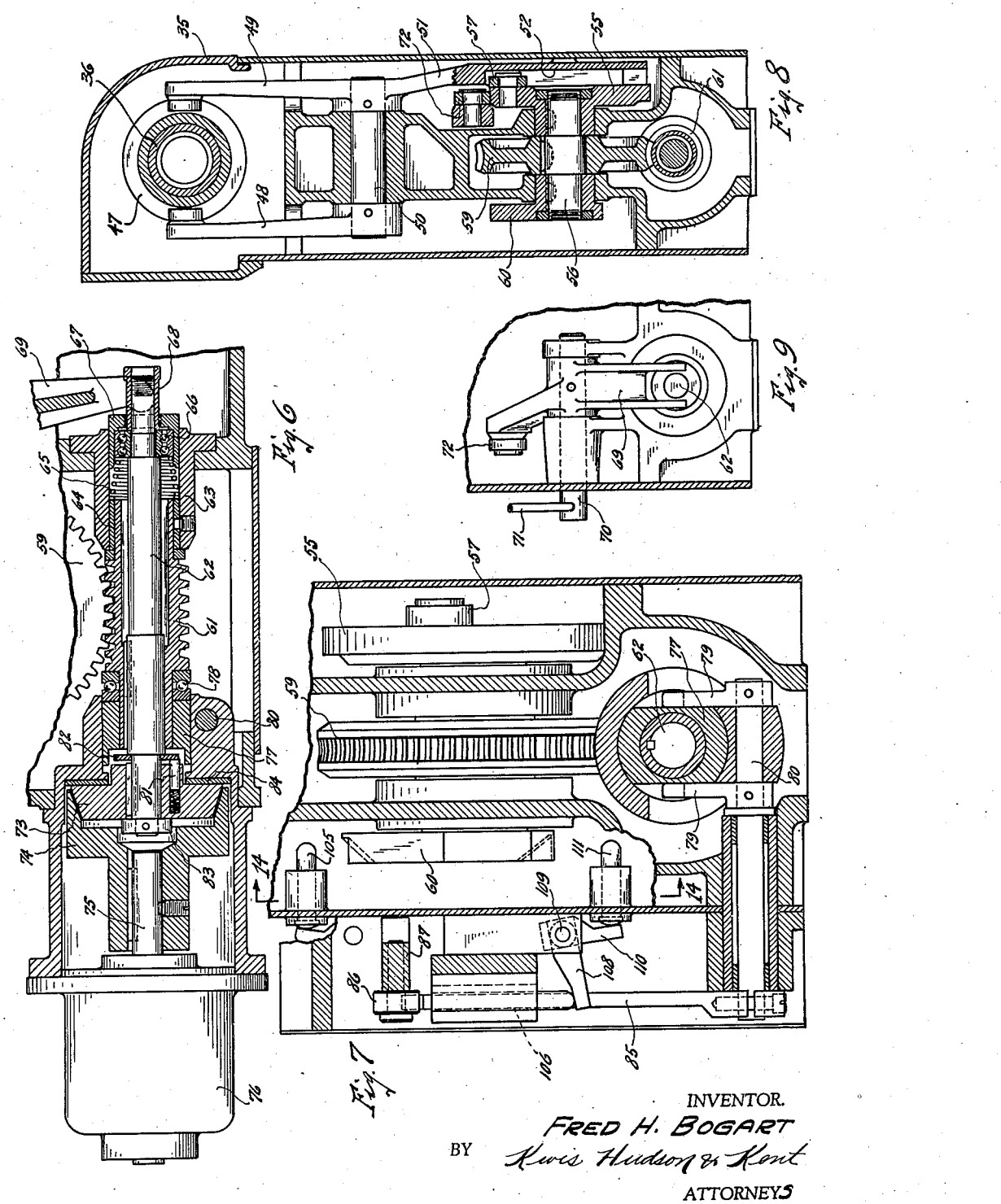
June 18, 1946. F. H. BOGART 2,402,273
MACHINE TOOL HAVING A TORQUE MEASURING DEVICE
Filed Sept. 18, 1941 9 Sheets-Sheet 3
INVENTOR.
FRED H. BOGART
BY
ATTORNEYS

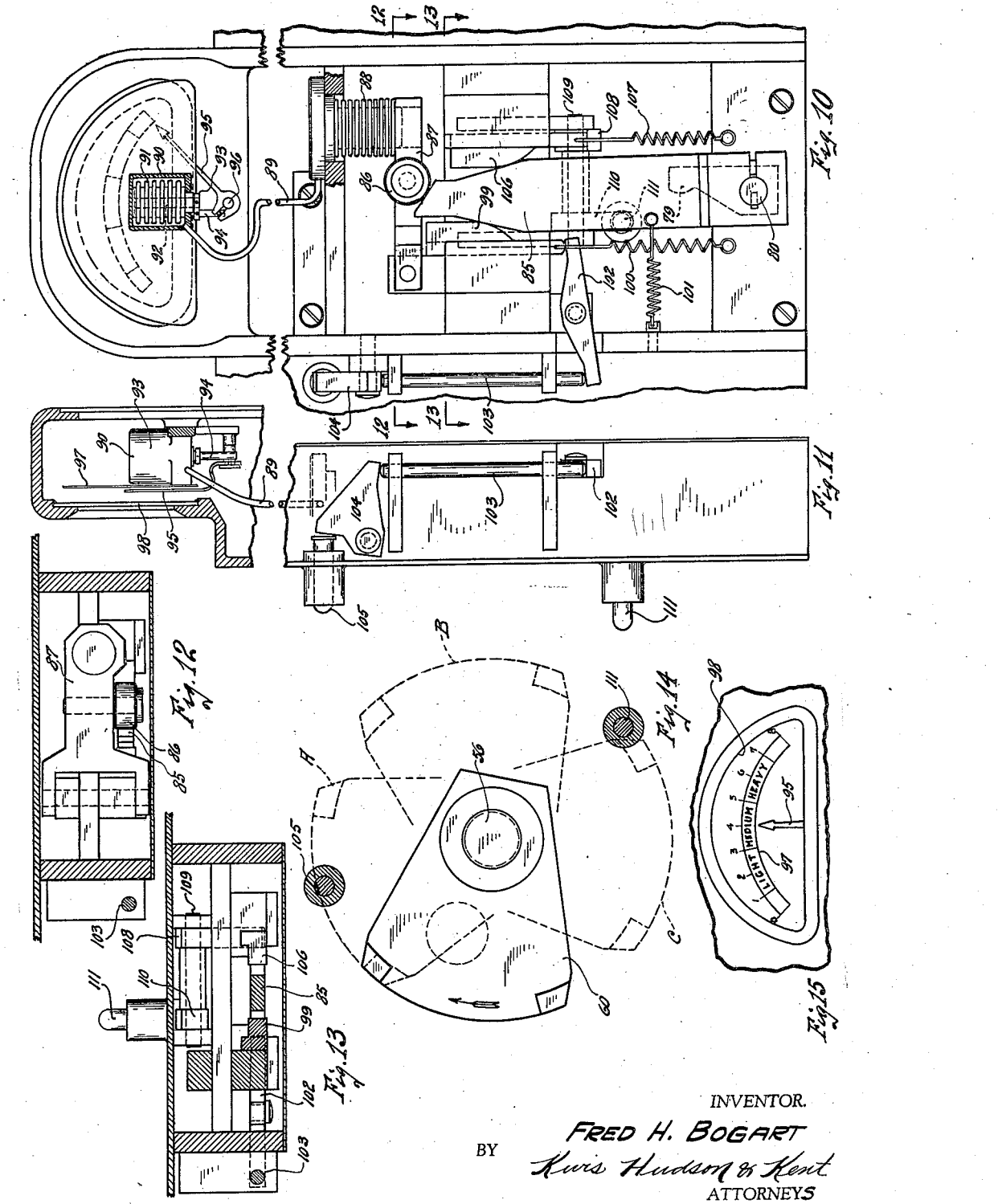

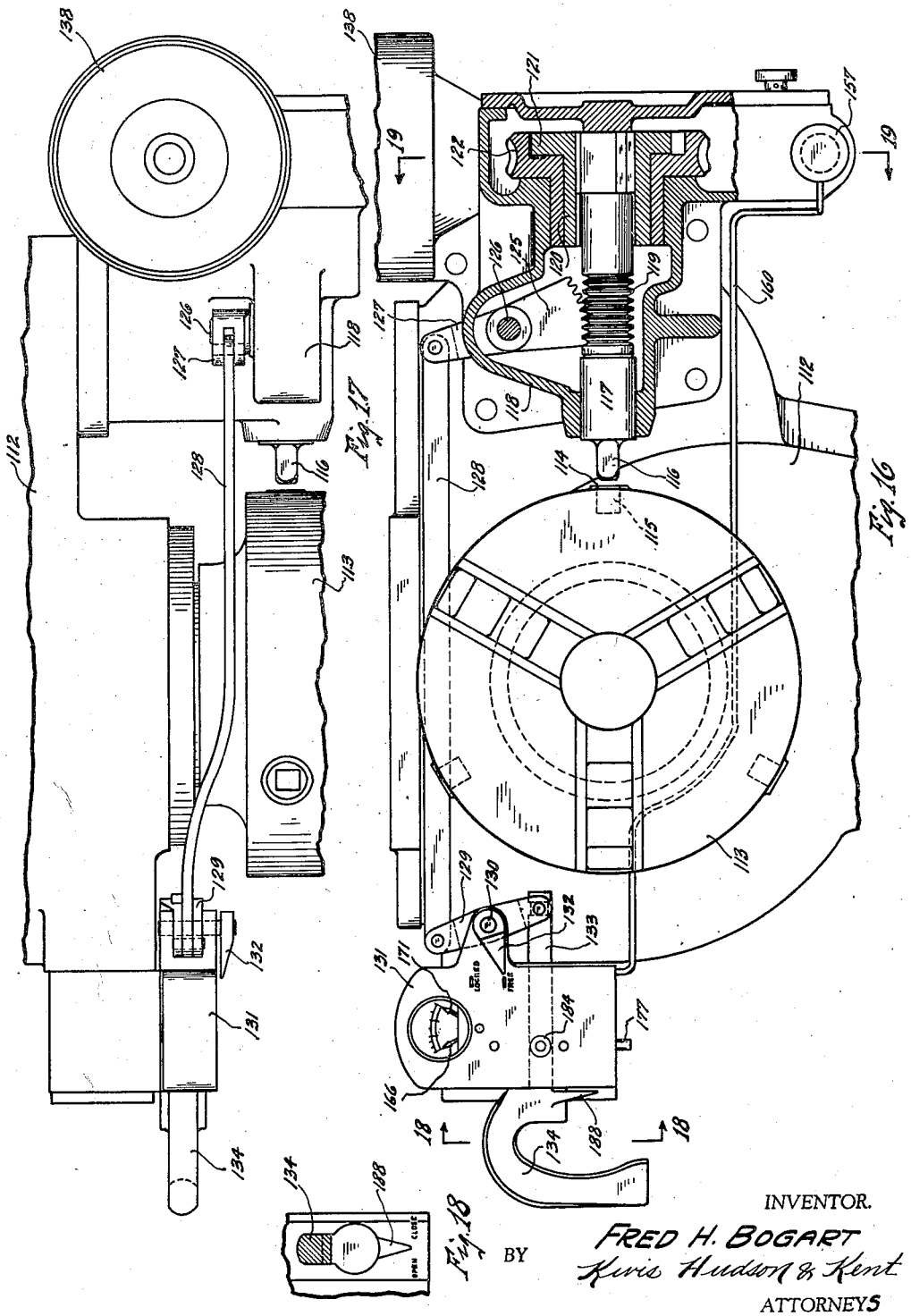

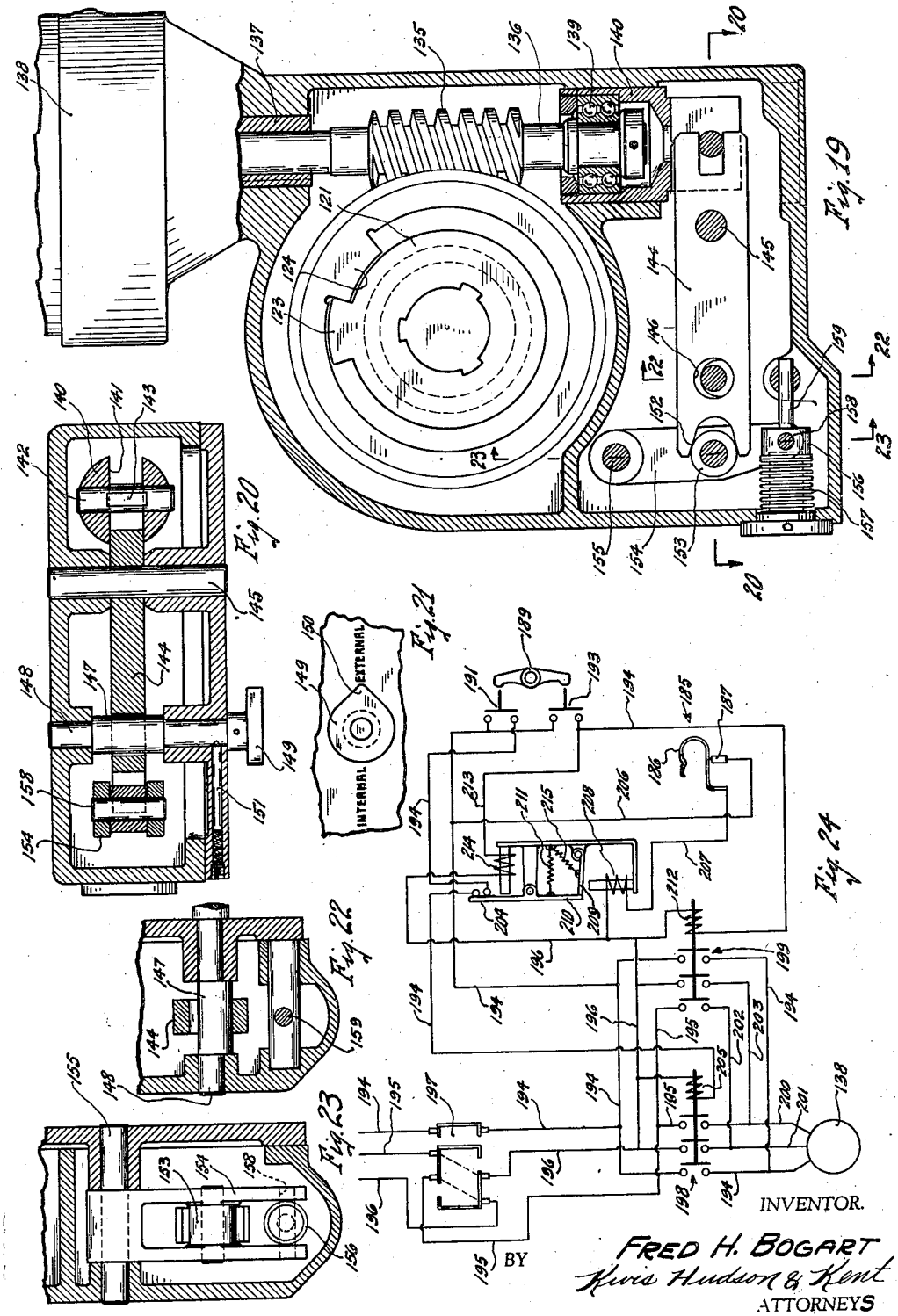

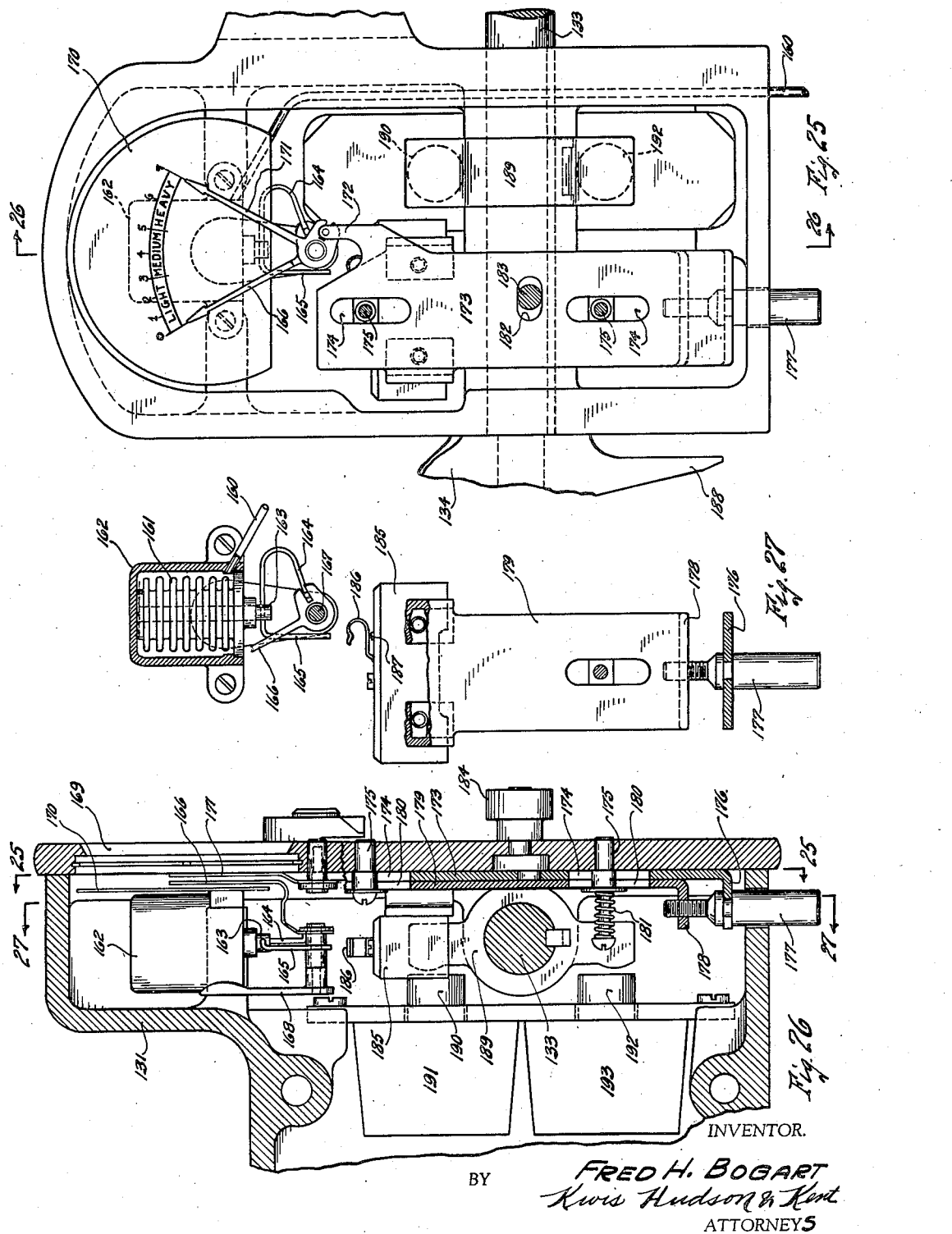

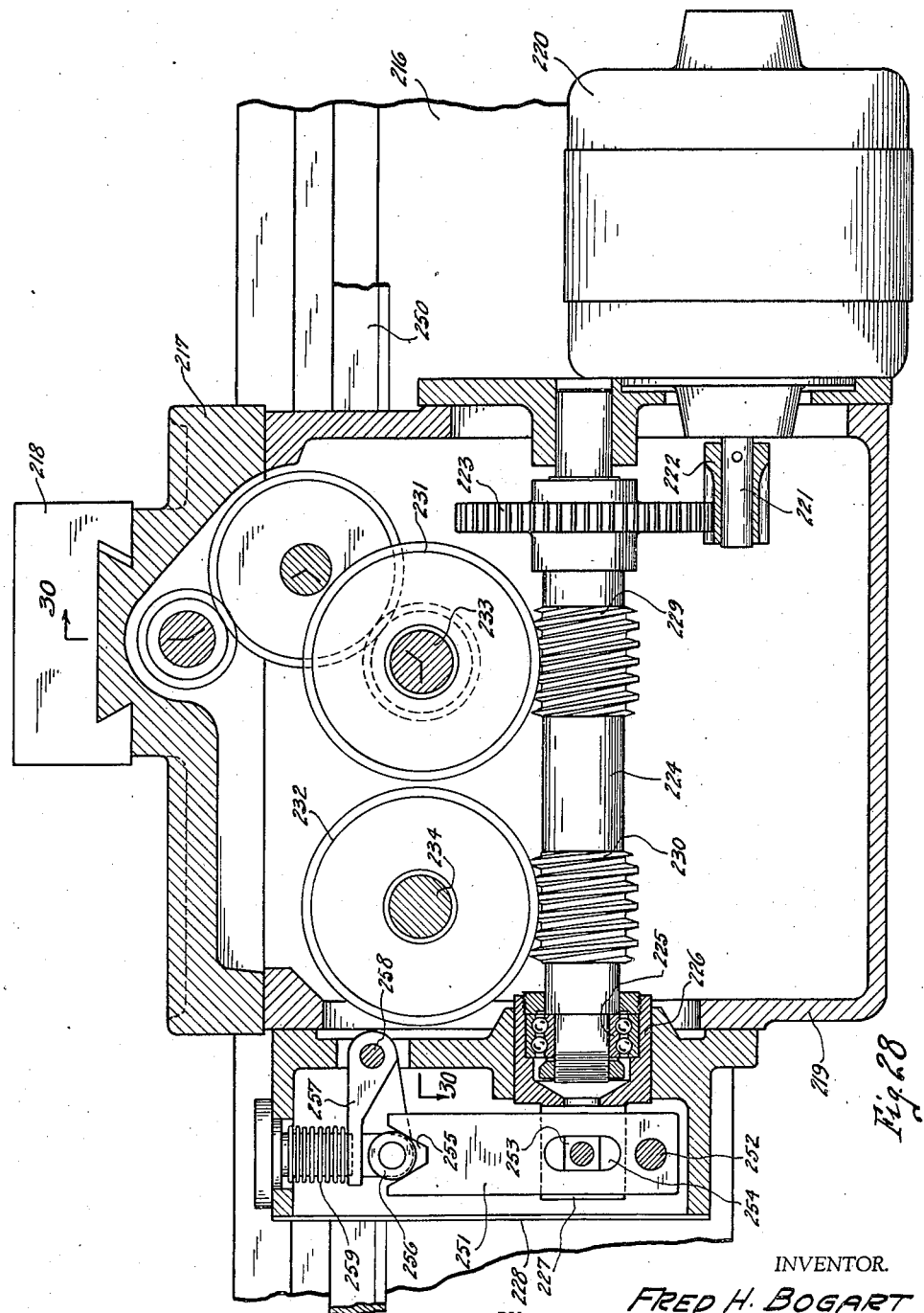

June 18, 1946.                F. H. BOGART                2,402,273
          MACHINE TOOL HAVING A TORQUE MEASURING DEVICE
                Filed Sept. 18, 1941        9 Sheets-Sheet 9
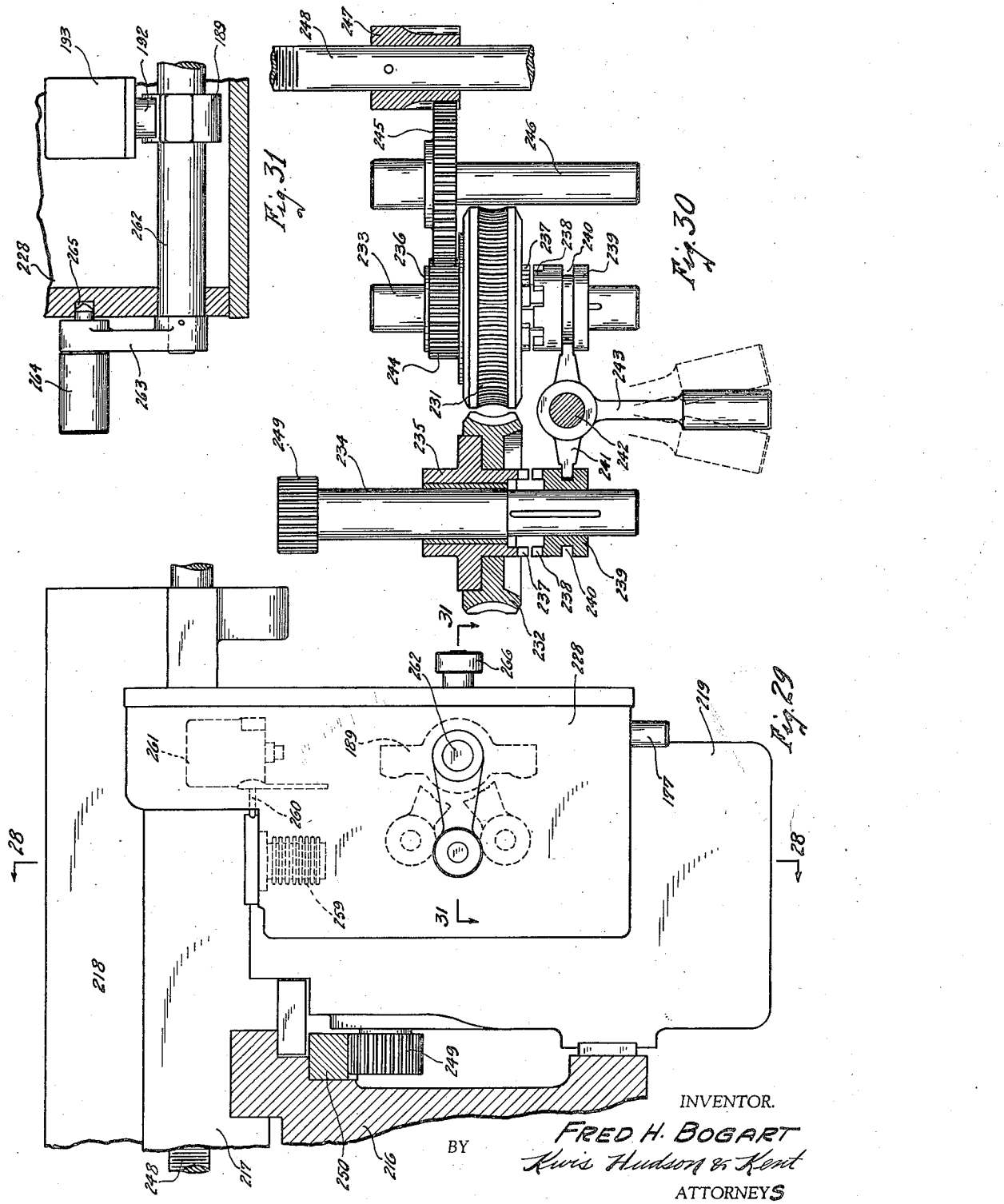
INVENTOR.
FRED H. BOGART
BY
ATTORNEYS Patented June 18, 1946

2,402,273

UNITED STATES PATENT OFFICE 2,402,273

MACHINE TOOL HAVING A TORQUE MEASURING DEVICE

Fred H. Bogart, South Euclid, Ohio, assignor to The Warner & Swasey Company, Cleveland, Ohio, a corporation of Ohio Application September 18, 1941, Serial No. 411,357

20 Claims. (Cl. 279—1)

This invention relates to a machine tool and to a device for indicating directly and visibly the force or torque transmitted by a mechanical train to a movable part of the machine tool.

A device embodying the present invention may be used advantageously in various types of machine tools which have movable parts operated by a mechanical train. However, the device possesses special utility when operatively associated with a machine tool of the turret lathe type to indicate visibly and directly the force or torque that is being applied by the mechanical train to the work holding means in holding or gripping the work piece or to the tool or work carrying means in applying operating pressures to the tool or work. Accordingly, the device embodying the invention will be described herein, solely by way of illustration and without limitation, as employed in the environment last referred to.

In operating a machine tool, as, for example, a turret lathe, it is desirable, in the interest of accuracy, efficiency, and safety of operation, that the operator be able to observe the pressure with which the work piece is being held or gripped or the pressure that is being exerted on the tool or work carrier to cause the tool to operatively function on the work piece.

An object of the present invention is to provide a device which may be operatively associated with the mechanical train that applies operating force or torque to a movable part of a machine tool to indicate visibly and directly to the operator the degree of force, torque or pressure applied to such part.

Another object of the present invention is to provide a device which may be operatively associated with the mechanical train that applies force or torque to the work holding means of a machine tool or to the tool or work carrying means of a machine tool to indicate visibly and directly to the operator the pressures with which the work is gripped or held or the pressures applied to the tool or work carrying means in causing the tool to operatively function on the work.

Another object is to provide a device such as specified in the first-named object or in the second-named object and which includes a movable indicating element and means for maintaining said element in indicating position throughout the period that force or pressure is being applied to such part, work holding means or tool or work carrying means of the machine tool.

Another object is to provide a device such as specified above and which includes a movable indicating element together with means for locking said element against movement in any direction to maintain said element in the indicating position so long as the work holding means is holding or gripping the work even though the force or torque applying train to the work holding means has ceased to operate.

Another object is to provide a device such as specified which includes means presettable to effect a discontinuance of the transmission of force or torque by the operating train to the movable part of a machine tool when the pressure or force applied by such part attains to a predetermined force or pressure.

Another object is to provide a device such as specified in association with the work holding means of a machine tool and which includes means presettable to a desired work holding or gripping pressure and functioning to effect a discontinuance of the application of force or torque by the operating train when said work holding or gripping pressure on the work has been reached.

Another object is to provide a device such as specified which is operatively associated with the mechanical operating train to a tool or work carrying means of a machine tool, which device includes means presettable to a predetermined pressure slightly in excess of the desired force or pressure to be applied to the tool or work carrying means and functioning to effect a discontinuance of the transmission of force or torque by said mechanical train whenever the desired force or pressure is exceeded and said predetermined force or pressure is reached.

A further object is to provide a device such as specified for operative association with the mechanical force or torque applying train to a movable part of a machine tool and which includes in connection with the indicating instrumentalities thereof visible means presettable to indicate the predetermined pressure or force to be applied to said movable part and functioning automatically to disconnect the power source from the force or torque applying train when said predetermined pressure or force has been reached.

A still further object is to provide a device of the type specified for operative association with the mechanical force or torque applying train to a stock or work gripping mechanism of a chuck of the non-slidable or rockable jaw type, for example, a collet chuck, and which device indicates visibly and directly the gripping pressure of the collet jaws upon the work or stock for any gripping adjustment of said mechanism.

A still further object is to provide a device such as specified for operative association with the force or torque applying train to a chuck of the sliding jaw type, for example, a universial chuck, and which device embodies visible means presettable to different predetermined gripping pressures of the chuck jaws, in combination with means to disconnect the power source from said force or torque applying train when the chuck jaws grip the work at said predetermined pressures.

Another and more general object is to provide a device such as specified which, when operatively associated with the mechanical force or torque applying train to a movable part of a machine tool, improves the efficiency, accuracy, and facility of operation of the machine tool and obviates the likelihood of damaging such part or the work piece because of the application of too heavy forces on such part or too heavy or too light gripping pressures on the work.

Further and additional objects or advantages not hereinbefore specified will become apparent hereinafter during the detailed description of several embodiments of the invention which is to follow.

Referring to the accompanying drawings,

Fig. 1 is a sectional view of a stock gripping mechanism of the collet chuck type and of a device applied thereto for indicating the gripping pressure of the collet jaws upon the work piece, the headstock of the machine tool to which the gripping mechanism is applied being omitted with the understanding that the housing of the device is bolted or otherwise secured to said headstock;

Fig. 2 is a detached detail view showing certain of the parts of the device shown in Fig. 1 but in different operative position;

Fig. 3 is a view similar to Fig. 1 but omitting certain of the parts shown in said Fig. 1 while illustrating in section other parts not disclosed in Fig. 1;

Fig. 4 is a detached detail view similar to Fig. 2 but showing the parts in different relationship;

Fig. 5 is a view similar to Figs. 2 and 4 but showing the parts in a still different relationship;

Fig. 6 is an enlarged sectional view of the lower part of Fig. 3;

Fig. 7 is a fragmentary sectional view taken substantially on line 7—7 of Fig. 3 looking in the direction of the arrows;

Fig. 8 is a sectional view taken substantially on irregular line 8—8 of Fig. 3 looking in the direction of the arrows;

Fig. 9 is a fragmentary sectional view taken looking from the right of the lower part of Fig. 3;

Fig. 10 is a complete rear elevational view taken from the left-hand side of the fragmentary view of Fig. 7 with the rear closure plate of the housing removed;

Fig. 11 is an end elevational view taken from the left-hand side of Fig. 10, with portions of the housing removed or broken away to disclose the interior parts;

Figs. 12 and 13 are sectional views taken, respectively, on lines 12—12 and 13—13 of Fig. 10 looking in the direction of the arrows;

Fig. 14 is a detached view taken on line 14—14 of Fig. 7, looking in the direction of the arrows, and illustrating in full lines one position of a cam member, while in dash lines illustrating other operative positions of said cam member;

Fig. 15 is a detached front elevation of the indicator shown in Figs. 1 and 3 but on a larger scale;

Fig. 16 is an end elevational view of the headstock of a machine tool looking at the work carrying end of the work spindle which in this instance is equipped with a chuck of the universal type and having a modified form of the device embodying the invention operatively associated with the torque applying elements of said chuck;

Fig. 17 is a fragmentary top plan view of the headstock shown in Fig. 16;

Fig. 18 is a detail sectional view taken substantially on line 18—18 of Fig. 16, looking in the direction of the arrows;

Fig. 19 is a view partly in section and partly in elevation, with the sectional portion being taken on line 19—19 of Fig. 16, looking in the direction of the arrows;

Fig. 20 is a sectional view taken substantially on line 20—20 of Fig. 19, looking in the direction of the arrows;

Fig. 21 is a fragmentary elevational view taken from the lower side of Fig. 20;

Figs. 22 and 23 are fragmentary sectional views taken, respectively, on line 22—22 and irregular line 23—23 of Fig. 19, looking in the direction of the arrows;

Fig. 24 is a wiring diagram of the electrical circuits and controls employed in connection with the device which is operatively associated with the torque applying elements, as indicated in Figs. 16 to 23 inclusive;

Fig. 25 is an elevational view of the indicating portion of the device shown in Fig. 16, with the front cover plate removed, and is taken on line 25—25 of Fig. 26, looking in the direction of the arrows;

Fig. 26 is a sectional view taken approximately on line 26—26 of Fig. 25, looking in the direction of the arrows;

Fig. 27 is a detached sectional view taken along line 27—27 of Fig. 26, looking in the direction of the arrows;

Fig. 28 discloses a modified form of device embodying the invention as applied to the torque applying elements for the feed drive of a cross slide and cross slide carriage, said view being partly in section and partly in elevation, the sectional portion being taken along line 28—28 of Fig. 29, looking in the direction of the arrows;

Fig. 29 is an end elevational view taken from the left-hand end of Fig. 28;

Fig. 30 is a detached developed view taken along irregular line 30—30 of Fig. 28, looking in the direction of the arrows; and Fig. 31 is a fragmentary sectional view taken on line 31—31 of Fig. 29, looking in the direction of the arrows.

It will be understood that the work gripping mechanism is shown, by way of illustration, applied to a work spindle which extends into and is supported by the headstock of a machine tool, as is well known in the art, and, therefore, said headstock has not been illustrated. It will be understood also that the housing which supports part of the work gripping mechanism and the device embodying the present invention which is associated with the torque applying elements of said mechanism are secured by suitable means to the end of such headstock.

Referring to Fig. 1, the housing just referred to is indicated at 35, while the work spindle is shown at 36. The work gripping mechanism comprises, in this instance, a collet of the push-out type and having spring jaws 37 which have inclined arcuate surfaces cooperating with similarly inclined annular surfaces on the collet hood 38 which is screwed onto the end of the work spindle 36. It will be understood that other chucks of the non-sliding or rockable jaw type might be used as, for instance, chucks of the rocking pivoted lever jaw type.

It will be understood that movement of the collet toward the right, as viewed in Fig. 1, will cause the jaws to be cammed or rocked inwardly to grip the work 39.

Slidably supported in the bore of the work spindle 36 is a collet sleeve 40 which has its right-hand end engaging with the collet while its left-hand end projects beyond the work spindle and is provided with an annular shoulder 41. Slidably mounted in the bore of the collet sleeve 40 is a stock feeding tube 42 provided at its right-hand end with spring fingers adapted to grip and feed the stock when moved toward the right, as will be well understood. The left-hand end of the tube 42 is operatively connected with the stock feeding mechanism which need not de described in detail as it does not form per se any part of the present invention and is fully described and illustrated in my copending application Serial No. 431,809, filed February 21, 1942. A finger housing 43 is mounted adjustably on the work spindle 36 and this finger housing has pivotally mounted therein fingers 44 in the form of bell crank levers. The fingers 44 are provided with heel portions 45 contacting the annular shoulder 41 of the collet sleeve and also with rollers 46 engageable with the periphery of a cone 47 that is slidably mounted on the work spindle and has an annular groove formed therein in which are located rollers carried by the lever arms 48 and 49.

A rockable pin 50 carried by the housing 35 is fixedly connected to the lever arms 48 and 49 see Fig. 8. The lever arm 49 has a downward extension beyond said pin, as indicated at 51.

Assuming that the collet jaws 37 are in the non-gripping position, the cone 47 will be in the dash line position of Fig. 1. It will be understood that when the lever arms 48 and 49 are rocked to move said cone from the dash line position to the full line position of Fig. 1, the fingers 44 will be spread to cause the heel portions 45 to press against the annular shoulder 41 of the collet sleeve and move the latter and the collet toward the right, whereupon the collet jaws 37 are cammed inwardly by the collet hood 38 to work gripping position. Conversely, when the arms 48 and 49 are rocked in the opposite direction to move the cone 47 from the full line position of Fig. 1 to the dash line position, then the outward pressure upon the fingers 44 is relieved, whereupon the collet sleeve and collet move toward the left under the action of the spring jaws and the gripping of said jaws on the work is relieved.

The mechanism by which the levers 48 and 49 are rocked to effect the gripping and releasing movements of the collet as just explained will now be described but not claimed herein as said mechanism per se forms part of the invention covered by my hereinbefore mentioned copending application Serial No. 431,809.

The downwardly extending portion 51 of the lever 49 is provided on its inner side with a milled-out recess 52, see Fig. 8, which recess has its walls shaped to define curved surfaces 53 and 54 with clearing spaces located intermediate said surfaces, see Figs. 1, 2, 4, and 5.

A suitable bearing in the housing 35 rotatably supports a roller disk 55 which has an integral sleeve portion extending into said bearing and fixed to a shaft 56, see Fig. 8. The disk 55 has on its outer face a bearing pin carrying a roller 57 which extends into the milled-out recess 52 in the downwardly extending portion 51 of the lever arm 49 and in such position as to cooperate with the curved surfaces 53 and 54. The disk 55 is provided on its circumference with a pair of recesses 58 which are spaced circumferentially of the disk from each other substantially 180° for a purpose later to be pointed out. The shaft 56 intermediate its ends is provided with an enlarged portion which has fixed thereto a worm wheel 59 for a purpose which will later become apparent. Also fixed on the shaft 56 and rotatable in the bearing is the integral sleeve portion of a cam disk 60, see Figs. 8 and 14. The purpose of the cam disk 60 will later be explained.

The worm wheel 59 meshes with a worm 61 formed on an elongated sleeve that is splined to a shaft 62. A shouldered sleeve bearing 63 is fixed in an opening in the housing 35 and is provided at its inner end with a bearing bushing 64 which supports the sleeve of the worm 61 and also forms an abutment for one end of a coil spring 65 which surrounds the shaft 62 and abuts at its opposite end the outer race of an anti-friction bearing 66. This outer race of the anti-friction bearing 66 is carried by a non-rotatable but endwise displaceable cup-shaped pusher member 67 that is slidably supported in the bearing sleeve 63 and projects outwardly of the end thereof.

The inner race of the anti-friction bearing 66 is carried by the shaft 62 and held in position by a lock nut 68 which is carried upon a reduced extension of the shaft 62 that projects through an opening in the pusher member 67. The lower forked end of a lever arm 69 freely straddles the lock nut 68 between the head of said nut and the outer side of the pusher member 67, see Figs. 3, 6, and 9. The lever arm 69 is provided intermediate its ends with a hub portion fixed to a rockable shaft 70 that extends outwardly of the housing and has fixed thereto an operating handle 71. The lever arm 69 extends above the shaft 70 and carries at its upper free end a roller 72 which rides on the periphery of the disk 55.

It will be seen that when the lever arm 69 is rocked in a clockwise direction as viewed in the drawings, the pusher member 67 is moved inwardly of the bearing 63 and against the pressure of the spring 65, with the result that the shaft 62 is displaced toward the left, as viewed in the drawings, for a purpose now to be explained.

The left-hand end of the shaft 62 has splined thereto a clutch member 73 of a friction clutch, the other clutch member of which is indicated at 74. The clutch member 74 is formed with an integral sleeve portion fixed to the motor shaft 75 of a flanged motor 76 that is secured to the outer end of an extension of the housing 35. This extension of the housing 35 is, for purposes of assembly, made in the form of a sleeve which, at its right-hand end, extends into the housing. This inwardly extending portion of the sleeve supports a non-rotatable endwise movable thrust responsive member 77 which, in turn, supports the sleeve-like portion of the worm 61. An anti-friction thrust bearing 78 is interposed between the member 77 and a shoulder formed by the worm 61. The member 77 is provided on its periphery with cut-away portions into which extend lever arms 79 that project through suitable openings formed in the inwardly extending portion of the extension of the housing which carries the member 77. The lever arms 79 restrain the member 77 from rotation but said arms will be rocked by said member when said member is displaced endwise.

The lever arms 79 are fixed at their lower ends to a rockable shaft 80 supported in the housing and extending transversely with respect to the shaft 62. The resistance exerted by the worm wheel 59 to the rotation of the worm 61 will create an end thrust acting against the thrust bearing 78 and the member 77 and cause a displacement of said member, with a resulting rocking movement of the lever arms 79 and the shaft 80. An internal shoulder formed in the extension of the housing which supports the member 77 acts as a positive stop to limit the displacement of said member toward the left, and such shoulder is so located as to permit the maximum displacement of said member.

The shiftable clutch member 73 is provided with a plurality of circumferentially spaced recesses containing spring-pressed plungers 81 which engage with an abutment washer 82 on the shaft 62 and bearing against a shoulder on said shaft, one of said plungers being shown in Fig. 6. The spring-pressed plungers 81 act to hold the clutch member 73 against a collar 83 fixed to the left-hand end of the shaft 62. It will be seen that when the lever 69 is rocked to shift the shaft 62 axially toward the left, the clutch member 73 will move with said shaft until it is in clutching engagement with the clutch member 74, after which further movement of the shaft 62 toward the left is relative to the member 73 and results in the springs being compressed behind the plungers 81.

When the lever 69 is rocked in the opposite direction the spring 65 will shift the shaft 62 axially toward the right. The first part of this latter shifting movement causes a relative movement between the shaft 62 and the clutch member 73 until the collar 83 is in engagement with said clutch member, after which the clutch member 73 and the shaft move together until the right-hand face of the clutch member 73 engages with the stationary brake disk 84 which acts to stop the rotation of the shaft 62, which has been disengaged from its driving relationship to the motor 76. It will thus be seen that the spring 65 functions to disengage the friction clutch and also to apply the brake to stop the rotation of the shaft 62 and the worm 61.

As just explained, the axial displacement of the worm 61 to the left because of the resistance to rotation of the worm wheel 59 shifts the member 77 and rocks the lever arms 79 and the shaft 80. This rocking movement of the shaft 80 is transmitted to an upwardly extending camming member 85 the lower end of which is fixed to the left-hand end of the shaft 80, see Figs. 7 and 10.

The cam member 85 is substantially elongated as compared to the lever arms 79 (see Fig. 10) and is provided at its upper end with a camming surface that engages a roller 86 mounted on an arm 87. The arm 87 has its left-hand end forked and pivotally supported on a pin carried by suitable portions of the housing, see Figs. 10 and 12. The swinging of the cam member 85 varies the angular relationship between the camming surface and roller and requires variable forces to move the member 85 in constant increments of movement.

The right-hand end of the arm 87 is provided with an opening into which extends a pilot portion on the lower end of a Sylphon 88. The Sylphon 88 is filled with a fluid and has a variable resistance directly proportional to the rate of its collapsing movement and functions similar to a compression spring. The interior of the Sylphon 88 is connected by a conduit 89 with a cylinder 90 mounted at the upper end of the housing. Mounted in the cylinder 90 is a Sylphon 91 fixed at its lower end to the cylinder and acting when it is collapsed or expanded as a piston within the cylinder. It will be understood that the Sylphon 91 functions similar to the Sylphon 88. A rod 92 is located within the Sylphon 91 and connected to the upper end of the latter. The lower end of the rod 92 extends beyond the lower end of the Sylphon 90 and the cylinder 90 and is connected by a laterally extending arm 93 to a second and downwardly extending rod 94. The rod 94 carries adjacent its lower end a pin extending into a radial slot formed in the hub portion of an indicating hand 95. The hub portion of the indicating hand 95 is rockably supported on a shaft 96 that is fixedly carried by a downward extension of the cylinder 90, see Figs. 10 and 11. The cylinder 90 is supported by the rear wall of the housing 35 and has attached to its front side a dial 97 which lies behind and is visible through a window 98 formed in the front side of the housing at the upper end thereof. The hand 95 cooperates with this dial and lies intermediate the same and the window 98, wherefore the movement of the hand across the dial is visible through the window. The dial 97 bears indicia calibrated in this instance in terms of gripping pressures of the collet jaws 37.

Referring to Fig. 15, it will be seen that such gripping pressures are indicated in units by numbers and also in zones by the words "Light," "Medium," and "Heavy." Of course the indication of the gripping pressures may be in any suitable or desired manner so long as the comparative values of such pressures are represented on the dial, that is, these gripping pressures may be represented not only by indicia, such as numbers and words, but also by colors, lights, or other suitable means.

It will be recalled that the rotation of the worm wheel 59 acts through the disk 55 and the roller 57 to rock the levers 49 and 48 to shift the cone 47 and spread the fingers 44 to effect gripping engagement of the collet jaws 37 with the work 39. The resistance offered to the shifting of the cone 47 is directly proportional to the gripping pressure of the jaws 37 on the work piece and this resistance is transmitted, through the parts previously referred to, to the rotation of the worm wheel 59. Consequently the resistance to rotation of the worm wheel 59 is transmitted to the worm 61 in the form of end thrust. The worm 61, being axially shiftable, can be compared to a rack, while the worm wheel is analogous to a gear or pinion in mesh with said rack.

The resistance to rotation of the worm wheel 59 causes the worm 61 to be axially shifted toward the left in direct proportion to said resistance, with the result that the member 77 is correspondingly moved and the lever arms 79 and the shaft 80 rocked. The rocking of the shaft 80 rocks the cam member 85, and the camming surface at the upper end of said member engaging with the roller 86 swings the arm 87 upwardly about its pivot and against the resistance of the Sylphon 88. The upward swinging movement of the arm 87 compresses or collapses the Sylphon 88 in proportion to the amplitude of such movement of the arm 87 and forces the fluid in the Sylphon through the conduit 89 and into the cylinder 90. The fluid thus forced into the cylinder 90 compresses or collapses the Sylphon 91 in similar proportion to the compression of the Sylphon 88, and through the operative connections between the Sylphon 91 and the indicating hand 95 the latter is swung or moved across the face of the dial 97 in proportion to the compression of the Sylphon 91. The combined compression of the Sylphons 88 and 91 will be seen to be in proportion to the amplitude of movement of the arm 87 which is determined by the extent of the shifting movement of the worm 61.

It will be seen that the Sylphons 88 and 91 and the parts operatively associated therewith constitute mechanism for weighing or measuring the resistance to rotation of the worm wheel 59, that is, the torque transmitted by said worm wheel. The Sylphons 88 and 91 as they are collapsed or compressed have a variable resistance, that is, the extent of the collapsing movement of the Sylphons is not uniform for uniform increases in pressure. In other words, the Sylphons function similar to compression springs. When the resistance to rotation of the worm wheel 59 is light, the pressure on the Sylphons is proportionally light, resulting in a slight compression of the latter, but as the resistance to rotation of the worm wheel increases to a medium resistance, the pressure on the Sylphons becomes proportionally greater and further compresses the latter. When the resistance to the rotation of the worm wheel attains to a heavy resistance, the pressure upon the Sylphons is proportionally increased and the latter are compressed further to substantially the maximum amount. Since the indicating hand or finger 95 moves in accordance with the compression of the Sylphons, the position that said hand or finger takes on the dial will indicate whether the resistance to rotation of the worm wheel 59 is light, medium or heavy, or, if the dial is calibrated in different terms of pressure, the finger or hand will indicate the pressures in the selected terms or units.

In order to have the indicating hand or finger 95 remain in the indicating position to which it has been moved throughout the time that the collet jaws are gripping the work piece and including the period required for the restoration of the stock feeding mechanism and, of course, during the period that the cutting tools are operating upon the work piece, the following arrangement of parts is utilized.

Assuming that the cone 47 is in the dash line position of Fig. 1 and the collet jaws are in the non-gripping position, it will be seen that, when the lever 71 is depressed to engage the friction clutch and initiate rotation of the worm 61 and worm wheel 59, the roller 72 carried by the lever arm 69 is moved out of one of the depressions 58 in the disk 55. The rotation of the worm wheel 59 which has now been initiated causes the disk 55 to rotate and the roller 57 carried thereby to move so as to rock the lever arm 49 from the position shown in Fig. 2 to the position shown in Fig. 5, at which time the cone 47 is in its full line position of Fig. 1 and the fingers 44 are spread apart and the collet jaws are gripping the work. After the cone 47 has been brought to the full line position the worm wheel 59 and the disk 55 continue to rotate until the roller 72 which has been traveling on the circumference of the disk engages in the other depression 58 of the disk 55 at which time the friction clutch is disengaged under the action of the spring 65. During the idle rotation of the worm wheel 59 and disk 55 just referred to, the roller 57 on disk 55 moves from the full line position of Fig. 5 to the full line position of Fig. 1 and no movement is imparted to the lever arms 48 and 49. It is during this period that the stock feeding mechanism is restored to its initial position, as will be explained in my co-pending application Serial No. 431,809.

It will be understood that the movement of the cone 47 from the dash line position to the full line position of Fig. 1 has brought about a movement of the indicating hand or finger 95 across the face of the dial to indicate the gripping pressure of the collet jaws on the work.

A slidably mounted wedge member 99 is located adjacent the left-hand edge of the arm 85, as viewed in Figs. 10 and 13, and this wedge has a downwardly extending portion which is connected to a light spring 100 that acts, together with gravity, to move the wedge in a downward direction and against the left-hand edge of the arm 85. It will be seen that when the arm 85 is rocked in a clockwise direction to raise the lever arm 87, the wedge 99 will move downwardly and follow such movement of the arm 85 and will prevent the arm 85 from moving in an anti-clockwise direction under the action of the spring 101. Consequently the lever arm 87 is held in raised position and the pressures upon the Sylphons 88 and 91 are maintained until the wedge 99 is elevated so as to allow the arm 85 to move in an anti-clockwise direction. In order to raise the wedge 99 and allow the arm 85 to move in an anti-clockwise direction at the proper time, the following mechanism is employed.

The downwardly extending portion of the wedge 99 contacts one end of a lever arm 102 that is pivoted intermediate its ends and has its opposite end contacting a vertically slidable pin 103. The pin 103 is carried by the side wall of the housing 35 and has its upper end contacting a pivoted member 104 similar to a bell crank lever, see Figs. 10 and 11. The member 104 has another portion engaging the head of a slidably mounted push pin 105. It will be seen that when the push pin 105 is moved against the member 104 to rock the latter in a direction to push the pin 103 downwardly, the lever 102 will be rocked to elevate the wedge 99 to the position shown in Fig. 10.

A second wedge 106 is mounted in the housing for vertical sliding movement and is located adjacent the right-hand edge of the arm 85, as viewed in Figs. 10 and 13. This wedge 106 is provided with a downward extension that is connected to a light spring 107 that constantly tends, together with gravity, to draw the wedge downwardly and against the right-hand edge of the arm 85.

It will be seen that when the wedge 106 is in its downward position and in engagement with the right-hand edge of the arm 85 movement of said arm in a clockwise direction is prevented by the wedge. In addition, it will be noted that the arm 85 in any rocked position it may be in can be locked in such position and against movement in either direction by the wedges 99 and 106.

It will be appreciated that when the arm 85 is locked in any of its rocked positions the lever arm 87 is similarly maintained in whatever position it has been moved to and consequently the pressures are held on the Sylphons 88 and 91 and the indicating hand or finger 95 is maintained in the position to which it has been moved with respect to the face of the dial 98.

The downwardly extending portion of the wedge 106 contacts one end of a lever arm 108 the opposite end of which is fixed to a rockable shaft 109, see Figs. 7 and 10. Displaced axially of the shaft 109 from its point of connection to the lever arm 108 and fixed to the shaft is a second lever arm 110 which, adjacent its free end, contacts a head on the end of a push pin 111, see Figs. 7 and 11. It will be seen that when the pin 111 is pushed in a direction to rock the lever arm 110 in a clockwise direction the lever arm 108 will be similarly rocked in an upward direction and will move the wedge 106 upwardly, thus allowing the arm 85 to be rocked in a clockwise direction. The push pins 105 and 111 are automatically pushed in an operative direction by the cam disk 60 in the manner now to be explained.

Assuming that the parts are in the relative positions shown in Fig. 1, that is, the cone 47 is in the full line position and the collet jaws are gripping the work piece while the stock feeding mechanism has been restored, it will be noted that the roller 57 on the disk 55 is in the position indicated by full lines in said Fig. 1, while the roller 72 carried by the lever arm 69 is engaged in one of the depressions 58 of the disk 55. At this time the cam disk 60 is in the full line position of Fig. 14 while the wedges 99 and 106 are in locking engagement with the arm 85 and the push pins 105 and 111 have been moved to a position such that their outer ends lie in the path of rotation of the cam 60 as shown in Fig. 7. It will be understood that the distances the pins 105 and 111 have been pushed out depend on the position of the arm 85 and the location of the wedges.

It will be recalled that the indicating finger or hand 95 is now in its indicating position with respect to the dial 98 to show the gripping pressure of the collet jaws on the work piece. When the machining of the work piece has been completed and it is desired to release the collet jaws and feed the stock, the operator will depress the operating handle 71 to engage the friction clutch and again cause the rotation of the worm 61, worm wheel 59, disk 55 and cam disk 60. Prior to this rotation of the disk 55 the roller 57 is in the full line position of Fig. 1. When the operator depresses the handle 71 the roller 72 carried by the lever 69 moves out of the depression 58 of the disk 55 and upon the periphery of said disk. The rotation of the disk 55 first moves the roller 57 from the full line position of Fig. 1 into the full line position of Fig. 4 to rock the lever arms 48 and 49 and move the cone 47 from the full line position of Fig. 1 to the dash line position. During this rotation of the disk 55 the cam disk 60 has moved from the full line position of Fig. 14 into dash line position A.

It will be noted that the cam disk at the two outer corners thereof is provided with inclined surfaces (see Figs. 7 and 14), wherefore as the cam disk 60 moves from the full line position to position A the uppermost inclined surface engages the push pin 105 and cams the same in an operative direction to effect a raising movement of the wedge 99 to allow the arm 85 to rock in an anticlockwise direction and under the action of the spring 101. This movement of the arm 85 allows the lever arm 87 to rock downwardly under the action of the Sylphons 88 and 91 and relieves the pressures on said Sylphons, with the result that the indicating finger or hand 95 swings back to zero position.

It will be understood that the rocking of the lever arm 85 in the anti-clockwise direction shifts the worm 61 axially toward the right to its original position.

It will be noted that the arm 85 is locked against rocking movement in either direction during the first part of the movement of the lever arms 48 and 49 to move the cone 47 to release the stock gripping pressure on the collet jaws and until the cam disk 60 has moved sufficiently far so that the leading inclined surface thereof operates on push pin 105. Consequently, the position of the indicating hand or finger 95 does not change until the push pin 105 has been operatively moved by the cam 60 and the stock has been released.

After the gripping pressure of the collet jaws has been released and during the operation of the stock feeding mechanism the disk 55 and worm wheel 59 continue to rotate with the roller 57 moving idly from the full line position of Fig. 4 to the full line position of Fig. 2. The cam disk 60 also continues to rotate at this time from dash line position A to dash line position B, causing the cam disk to move out of engagement with the push pin 105. At this time the wedge 99 will be contacting the arm 85 under the action of the light spring 100 and when the arm 85 is in its most left-hand position as viewed in the drawings. It will be understood that as the arm 85 moved in an anti-clockwise direction the wedge 106 under the action of spring 107 followed the arm 85 until said wedge reached its lowermost position, wherefore the worm 61 has ceased to rotate.

The stock now having been fed the desired length the operator in order to again bring the collet jaws into gripping engagement with the stock depresses the handle 71 to effect engagement of the friction clutch and start rotation of the worm 61, worm wheel 59, disk 55, and cam disk 60. The first part of this rotation causes the roller 57 to move from the full line position of Fig. 2 into the full line position of Fig. 5 and rock the lever arms 48 and 49 to move the cone 47 from the dash line position of Fig. 1 into the full line position. At the same time the cam disk 60 moves from dash line position B into dash line position C and during this movement the leading inclined surface of said cam disk engages the push pin 111 and moves the same in an operative direction to raise the wedge 106 from its lowermost to its uppermost position. The raising of the wedge 106 takes place during the first part of the movement of the cone 47 and prior to the gripping pressure being applied to the collet jaws, wherefore the arm 85 can be rocked in a clockwise direction under the thrust exerted on the worm 61 with the wedge 99 moving downwardly and following the movement of the arm 85. Therefore the lever arm 87 is raised by the arm 85 against the resistance of the Sylphons 88 and 91, with a resulting movement of the finger or hand 95 to indicate the gripping pressure of the collet jaws on the stock.

When the cone 47 reaches the position wherein the collet jaws have attained their maximum gripping pressure, at which time the finger rollers 46 are contacting and moving along the circumferential surface of the cone, the cam disk 60 simultaneously moves away from the push pin 111, wherefore the wedge 106 is released and moves downwardly under the action of the light spring 107 and contacts the arm 85 in its maximum rocked position to prevent further rocking movement of the same in a clockwise direction.

It will be recalled that as the arm 85 rocked in a clockwise direction the wedge 99 followed the arm downwardly in contact therewith to lock the arm against rocking movement in an anti-clockwise direction. The remaining portion of the rotation of the disk 55 and the cam disk 60 takes place during the restoration of the stock feeding mechanism and such rotation moves the cam disk 60 from dash line position C into full line position of Fig. 14, while the roller 57 on the disk 55 moves from the full line position of Fig. 5 idly to the full line position of Fig. 1. The cutting tools can now be brought into engagement with the work piece which is gripped by the collet jaws, and during the entire cutting operation and until the collet jaws have been released from the work the finger or hand 95 remains in the indicating position and shows the gripping pressure that the collet jaws exert on the work piece.

From the foregoing description it will be seen that the amount of torque transmitted by the mechanical drive train to the chuck closing and opening mechanism is directly and visibly indicated on the indicating device in terms of the gripping pressures of the collet jaws on the work piece, in this instance through ranges of "light," "medium" and "heavy" gripping pressures.

It will also be seen that the indicator hand remains in the indicating position to which it has been moved during the closing of the chuck jaws upon the work piece until said jaws are released notwithstanding the fact that the operation of the mechanical drive train to the chuck closing and gripping mechanism has been terminated. This feature enables the operator, foreman or any other interested person to glance at the indicator at any time throughout the machining operation and directly and visibly see the gripping pressure of the chuck jaws on the work piece. Consequently, the operation of the machine, so far as gripping pressures are concerned, can be readily checked when desired and by persons other than the operator. It will be seen also that as soon as the operator releases or opens the collet jaws the indicating hand returns to initial or zero position.

In Figs. 16 to 24, inclusive, the invention is shown used in conjunction with a chuck of the sliding jaw type, such as, in this instance, a universal chuck. In Figs. 16 and 17 a portion of the headstock 112 of a machine tool is shown and, as is well known, said headstock rotatably supports a spindle on the outer end of which is mounted the chuck 113. This chuck is illustrated as of the universal type and includes a plurality of circumferentially spaced jaws sliding radially of the chuck and capable of gripping a work piece either internally or externally. The chuck jaws are moved inwardly and outwardly by a jaw operating scroll which in turn is rotated by circumferentially spaced pinions, all as well known in the art. The pinions referred to are indicated at 114 and have the conventional wrench sockets 115 (indicated in dash lines) associated therewith. The wrench 116 which engages in the sockets 115 is integral with a wrench spindle 117 slidably and rotatably supported in a housing 118 secured to the end face of the headstock. The spindle 117 intermediate its ends is formed with circular rack teeth 119 while the right-hand end of said spindle has a splined connection in the elongated hub 120 of disk 121 which operates with the worm wheel 122 in a manner later explained. The worm wheel 122 is provided with an elongated hub similar to the hub 120 and surrounding the latter, and said worm wheel hub is rotatably supported in the housing 118 (see Fig. 16). From the foregoing it will be evident that the wrench spindle 117 can have axial movement relative to the worm wheel and rotative movement with the worm wheel.

The disk member 121 is provided on its circumference with a radially and outwardly extending lug 123, while the worm wheel 122 has a recess in which the disk 121 is located and the circumference of said recess is provided with an inwardly and radially extending lug 124. It will be seen that when the worm wheel rotates and said lugs 123 and 124 are in engagement with each other the disk will rotate with the worm wheel. The purpose of providing the lugs 123 and 124 is to furnish a lost motion connection between the worm wheel and the disk 121 to produce a hammer blow in opening the chuck jaws, as will be well understood.

In order to move the wrench spindle 117 and wrench 116 endwise a gear segment 125 meshing with the rack portion 119 of the wrench spindle is fixed to a shaft 126 rotatably supported in the housing 118 and extending at one end outwardly of said housing. The outwardly extending end of shaft 126 has fixed thereto a lever arm 127 the upper or free end of which is pivotally connected to a link 128 that extends across the end face of the headstock above the spindle and toward the front of the machine. The forward end of the link 128 is pivotally connected to the upper end of a lever 129 that is fixed intermediate its ends to a pin 130 that is rockably mounted in supporting ears formed on the indicator housing 131. The indicator housing 131 is supported on the front side of the headstock and will be referred to more in detail hereinafter. The pin 130 at one end projects beyond its supporting ears and has fixed thereto a pointer 132 which cooperates with spaced indicating markings on the outside of the housing 131. The markings in the present instance and as illustrated in Fig. 16 bear the designations "Locked" and "Free."

The lower end of the lever 129 is forked and provided with shoes which engage in an annular groove formed near the inner end of a rod 133 which is slidably and rockably supported in the indicator housing 131. The rod 133 extends outwardly of the housing at the front of the machine and is provided with a spade handle grip 134.

It will be seen that when the handle grip 134 is pulled outwardly from the position shown in Fig. 16 the rod 133 slides toward the left as viewed in the drawings, rocks the lever 129 to move the link 128 toward the right and thus rock the lever 127 and gear segment 125 to move the wrench spindle axially and insert the wrench 116 in a socket 115 of the chuck. When this occurs the pointer 132 will be pointing to the designation "Locked" on the indicator housing 131, thus indicating to the operator or others that the chuck and work spindle are locked against rotation.

Conversely, when the handle grip 134 is moved from its outer position just dscribed to its inner position, as shown in Fig. 16, the movements of the parts are reversed, the wrench is withdrawn from the socket 115, and the chuck and the work spindle are free to rotate, at which time the pointer 132 points to the designation "Free" to indicate this condition.

The worm wheel 122 is in mesh with a worm 135 formed on a shaft 136 extending vertically in the housing 118 and said shaft is mounted for both rotative and endwise movement, as will now be explained. The upper end of the shaft is reduced and extends into the lower end of a shaft 137 operatively connected with the motor 138 and a splined connection is provided between the shaft 137 and said upper end of the worm shaft 136. The motor 138 is of the reversible type and is supported on the housing 118, as clearly shown in the drawings. The lower end of the worm shaft 136 is supported in an anti-friction thrust bearing 139 the inner race of which is located between spaced shoulders on the shaft while the outer race of said bearing is fixed in a bearing housing 140 that is axially or slidably movable in an internal supporting portion of the housing 118. The bearing housing 140 has a downwardly extending portion provided with a centrally disposed slot 141 across which extends a pin 142 rockably carried by said downwardly extending portion and provided with a pair of flats 143. A lever arm 144 is pivotally mounted on a pin 145 carried by the lower part of the housing 118, and this lever arm to the right of said pin has a forked portion extending into the slot 141 and straddling the pin 142. It will be seen that sliding movement of bearing housing 140 in either direction is occasioned by end thrust on the worm 135 and will cause the lever arm 144 to be rocked about its pivot 145 since the flats 143 of the pin 142 engage the fork of the lever arm 144. The end thrust of the worm will rock the lever 144 in one or the other direction, depending upon the direction of operation of the motor 138.

Inasmuch as the measurement of the torque is desired only for the work gripping operation, the lever arm 144 should not be rocked by the end thrust of the worm during the opening or releasing of the chuck jaws. As previously stated, the chuck may be operated for either external gripping or internal gripping of the work piece. When the chuck is operated for external gripping one direction of rocking movement of the lever 144 under the end thrust of the worm will occur during the closing of the chuck whereas when the chuck is operated for internal gripping the end thrust of the worm during the closing movement of the chuck will cause the lever 144 to rock in the opposite direction. It is desirable, therefore, to provide means for selectively preventing the rocking movement of the lever 144 in one or the other direction, depending upon whether the chuck is operating for internal gripping or external gripping and to prevent actuation of the indicator hand during the opening of the chuck.

In carrying this out the lever arm 144 adjacent its left-hand end, as viewed in Fig. 19, is provided with a circular opening 146 in which is located an eccentric 147 formed on a rotatable shaft 148 mounted in the housing 118 and extending beyond the outer face thereof. The outer end of this shaft 148 has fixed thereto a knob 149 provided with a pointer portion 150 which cooperates with indicia on the outer face of the housing and indicating "Internal grip" and "External grip." The shaft 148 is held in either of its two operative positions by means of the usual spring point 151 which engages in diametrically opposed notches formed in the shaft.

It will be seen that the eccentric 147 contacts a portion of the circumference of the circular opening 146 in the lever arm 144 and thus acts to hold the lever arm against rocking movement in one direction, although said arm may be rocked in the opposite direction a distance equal to the clearance between the eccentric and the diametrically opposite portion of the circumference of the opening 146.

It will be evident that the adjustment of the eccentric in the opening 146 will be in accordance with whether the chuck is operating for internal gripping or external gripping in order to prevent rocking movement of the lever arm and indicator hand during the jaw releasing operation, and this adjustment will be clearly indicated by the position of the pointer portion 150 of the knob 149.

The left-hand end of the lever 144, as viewed in Fig. 19, is in the form of a double camming portion 152 and this portion straddles a roller 153 mounted intermediate the ends and between the arms of a double armed lever 154 which is pivotally supported at its upper end in the housing 118 on a pin 155. It will be noted that the camming portion 152 contacts the roller 153 at a steeper angle than does the previously described camming portion of the member 85 with respect to the roller 86. Hence in the present instance a greater force is required for a given movement of the roller than in the former case. The lower ends of the two arms of the lever 154 straddle a member 156 forming part of a Sylphon 157 and are pivotally connected to said member by a pin 158. The member 156 is formed with a guiding portion 159 which slides in a guiding opening formed in a supporting shaft rockably mounted in the housing 118, as clearly shown in Fig. 19, wherefore the Sylphon 157 may be compressed or elongated in a substantially axial direction. The Sylphon 157 is supported in the housing 118 and is connected by a tube 160 with a Sylphon 161 supported in the indicator housing 131, see Figs. 19, 26, and 27. The Sylphons 157 and 161 are similar in function and make-up to the Sylphons 88 and 91, respectively, which have been described in connection with the indication of the gripping pressures of the chuck of the collet type.

It will be understood that when the lever arm 144 is rocked by the end thrust on the worm 135 to rock the lever 154 and compress the Sylphon 157 the fluid in the Sylphon 157 is forced through the tube 160 to the housing 162 of the Sylphon 161 and the pressure of said fluid acts to collapse said Sylphon. The Sylphon 161 is provided with an internal centrally located downwardly extending rod 163 which rigidly supports a stiff wire having a curved arm 164 provided with a laterally extending end portion and also having a downwardly extending arm 165. The laterally extending end portion of the arm 164 engages in a slot formed in a radial projection of the hub of an indicating hand 166 which hub is pivotally mounted on a pin 167 supported by a downwardly extending bracket 168 integral with the Sylphon housing 162. The Sylphon housing 162 is supported on the back wall of the indicator housing 131 and behind a window 169 formed in the housing 131. The Sylphon housing 162 supports a dial 170 on the front face of which is a curved scale graduated in units of gripping pressures of the chuck jaws on the work, and in this instance is divided into three zones of "light," "medium" and "heavy" gripping pressures. The movable indicating hand 166 extends in front of the dial 170 and the pointer on the upper end of said hand cooperates with the scale on the dial.

It will be seen that when the Sylphon 161 is collapsing under pressure movement will be imparted to the indicating hand 166 and the pointer at the end of the hand will move across the scale of the dial an amount proportional to the compression of the Sylphon.

A normally stationary but adjustable hand 171 is interposed between the indicating hand 166 and the window 169 and said hand 171 is pivotally supported at its lower end on a pin mounted in the front wall of the indicator housing 131. The hub at the lower end of the hand 171 has a radially projecting portion which is slotted to receive a pin carried by an upwardly projecting ear 172 formed integral with a plate 173 that is slidably supported on the inner side of the front wall of the indicator housing 131. The plate 173 is provided adjacent its opposite ends with vertically elongated guide slots 174 through which extend guide pins 175 projecting inwardly of the indicator housing 131 from the front wall thereof. The pins 175 are provided with guiding portions which slidably fit the elongated guide slots 174. The lower end of the plate 173 has a flange 176 extending inwardly and at right angles to the plate and said flange is slotted to interfit with a circular groove formed in an adjusting screw 177 that has an operating handle portion which extends through an opening in the bottom wall of the indicator housing 131 and outwardly beneath said housing. The screw 177 is threadedly connected with a flange 178 similar to the flange 176 and integral with the lower end of a second or inner plate 179 adjustable on the plate 173.

The plate 179 is provided with elongated guide slots 180 similar to the slots 174 and overlying the same and the guiding portions of the pins 175 slide in said slots 180. The upper pin 175 is provided with a washer which engages the inner surface of the plate 179 while the lower pin 175 carries a spring 181 pressing a similar washer into engagement with the inner plate 179, wherefore said plate is held in frictional contact with the plate 173 and the latter in frictional contact with the cover plate of the housing. The said plates normally move together but also can have relative sliding movement for the purpose of adjustment. The plate 173 intermediate its ends is provided with a horizontal elongated slot 182 and an eccentric pin 183 carried in the cover plate of the indicator housing 131 engages in said slot. The eccentric pin projects beyond the cover plate of the housing and is provided with an adjusting knob 184. It will be seen that the adjusting knob 184 can be turned to cause upward or downward movement as a unit of the contacting plates 173 and 179, and such movement results in the normally stationary hand 171 moving to various positions with respect to the scale of the dial.

It will be understood that the hand 171 is positioned by the knob 184 to indicate the gripping pressure desired. Such positioning of the hand 171 also adjusts upwardly or downwardly the position of a microswitch 185 secured to the plate 179 adjacent its upper end (see Figs. 26 and 27). The microswitch 185 carries a spring contact finger 186 which is adapted to be engaged by the arm 165 of the stiff wire that is carried by the rod 163 of the Sylphon.

It will be seen that when the Sylphon 161 is compressed and the rod 163 moved downwardly to bring the arm 165 into engagement with the spring contact finger 186 the latter is moved into contact with the fixed contact 187 of the microswitch 185 and such closing of the contacts of the microswitch effects the stopping of the motor 138 in a manner later to be pointed out.

In order to assemble the parts and adjust the same to their proper relationship so that the microswitch will be closed and the motor 138 stopped when the indicating hand 166 coincides with the position of the hand 171 which has been set to the maximum gripping pressure desired, the adjusting screw 177 may be rotated to adjust the plate 179 relative to the plate 173 and to move the microswitch upwardly or downwardly as the case may be. It will be recalled that the plate 173 is connected to the hand 171 while the microswitch is carried by the plate 179 and also that the turning of the knob 184 acts to move both plates 173 and 179 as a unit when the hand 171 is set to a predetermined pressure.

The rod 133 which has attached to it the hand grip 134 in addition to being slidable in the housing 131 is also rockable in said housing when the hand grip 134 is rocked. The hand grip 134 is provided with a pointer 188 which cooperates with indicia on the indicating housing when the hand grip is rocked. Reference to Fig. 18 will show such indicia in this instance to be as follows: "Open" or "Close." These terms designate the rocked position of the hand grip to effect the closing operation of the chuck or the opening or releasing operation thereof.

The rod 133 has a splined connection with the hub of the double armed switch operating member 189 which is mounted in the indicating housing 131 and held against axial movement with the rod by suitable bosses formed in the housing, see Fig. 25. It will be seen that when the rod 133 is rocked by the hand grip 134 in one direction the upper arm of the switch actuating member 189 cooperates with a push button 190 of a switch 191 to close the switch, it being noted that said push button and said switch are of the type in which the switch returns to its normally open position automatically when the rod 133 is moved in the opposite direction from the actuating direction.

The lower arm of the swtich actuating member 189 cooperates with the push button 192 of a similar switch 193. From the foregoing it will be obvious that one or the other of the normally open switches 191 and 193 can be closed by rocking the hand grip 134 in one or the other direction, i. e., to the "Closed" or "Open" position. The switches 191 and 193 control the direction of operation of the motor 138 as will now be explained.

The three conduits or leads from a source of electrical energy are indicated in Fig. 24 at 194, 195, and 196. The leads 194, 195, and 196 are connected, respectively, to a rotary reversing switch 197 indicated in Fig. 24 and located in the main switch box of the machine (not shown). The rotary reversing switch 197 can be set in one or the other of its two closed positions to effect operation of the motor 138 in one or the other direction depending upon whether the chuck is being operated for internal gripping or external gripping. Of course, additional means is provided for reversing the direction of rotation of the motor, as will now be explained, to effect opening and closing of the chuck jaws for both internal gripping and external gripping.

The dotted lines shown in the rotary reversing switch 197 in Fig. 24 indicate the flow of current through the switch when the switch is turned to the reverse position from that shown by full lines in said figure.

The current in lead 194 passes through the switch 197 in the same manner for both operative positions of the switch. The current through leads 195 and 196 passes through the switch for one setting of the latter, as indicated by full lines in Fig. 24, but, when said switch is reversed, the current entering the switch through lead 195 leaves said switch through lead 196 while the current entering the switch through lead 196 leaves the switch through lead 195, thus effecting a reversal in the direction of rotation of the motor, as will be well understood.

The lead 194 extends to one terminal of a solenoid-operated switch 198 and also to one terminal of a similar solenoid-operated switch 199, both of these switches being normally opened by gravity or spring pressure, as will be understood. In addition, the lead 194 has a branch connection with the switches 191 and 193.

The lead 195 is connected to a terminal of the switch 198 and a terminal of the switch 199.

The lead 196 also is connected to a terminal of the switch 198 and a terminal of the switch 199.

The switch 198 when closed causes the motor to operate in the direction for moving the jaws in the work gripping direction and the closing of the switch 199 effects operation of the motor in a direction to release the work or open the jaws. It will be seen that when the switch 198 is closed the current is flowing to the motor 138 in one direction of operation through the switch and the leads 194, 200, and 201. When the switch 199 is closed for the reverse operation of the motor, said switch is in circuit with the motor through lead 194, lead 202 which connects with motor lead 201, and lead 203 which connects with motor lead 200. It will be noted that the leads 202 and 203 are connected through the switch 199 with the leads 195 and 196, respectively, but that said leads 202 and 203 are connected to the motor 138 by leads 201 and 200, respectively, thus causing a reversal of the flow of current through the motor.

The current through the lead 194 when the switch 191 is closed passes through said switch, thence it flows through the normally closed switch 204, and through the solenoid 205 which actuates the switch 198, from whence it flows to the lead 196 which, in this instance, forms the negative side of the circuit.

At this time the switch 198 is closed and the motor 138 is operating in one direction, i. e., the chuck closing direction. The motor operates and moves the jaws toward the work piece until the jaws are gripping the latter with the predetermined pressure, at which time the microswitch 185 is closed by the engagement of the arm 165 of the stiff wire with the spring contact 186, as previously explained.

The fixed contact 187 of the micro-switch 185 is connected to lead 194 by a lead 206, and when the switch is closed current flows through the lead 206, the switch and thence through a lead 207 and through a magnet 208 to the lead 196. The magnet 208, when it is energized, pulls the spring tensioned latch 209 out of contact with the end of the normally closed pivoted switch lever 210, whereupon the spring 211 rocks said switch lever and opens the normally closed switch 204, thus breaking the circuit to the solenoid 205 and opening the switch 198 to stop the operation of the motor.

It will be understood that the switch 198 was closed by the closing of the switch 191 when the operator turned the hand grip 134. However, it will be noted that the switch 198 is opened even though the switch 191 remains closed, namely, by the opening of the normally closed switch 204 when the micro-switch 185 is closed. Therefore, as soon as the jaws have gripped the work with predetermined pressure and have stopped their gripping movement, the operator can release the hand grip 134 and the switch 191 will open and cause the hand grip and the rod 133 to rock until the hand grip is in the vertical position shown in Fig. 18.

When the machining operation on the work piece is completed and the operator desires to release the chuck jaws, he rocks the hand grip 134 to "Open" position, with the result that normally open switch 193 is closed, whereupon current flows through the switch 193, the lead 194 to the solenoid 212, and thence to the negative side, i. e., lead 196. The energization of the solenoid 212 closes the switch 199 whereupon current flows through the lead 194, through the switch 199, and continues through the lead 194 to the motor 138. The current also flows through the lead 195, through the switch 199, through the lead 202, and then through the lead 201 to the motor. Additionally, the current flows through the lead 196, through the switch 199, and through the lead 203 and the lead 200 to the motor. It will be clear that the motor 138 is now operating in the reverse direction from that previously described and the chuck jaws are being moved to opened or released position.

The closing of the switch 193 also causes current to flow through the lead 194, the switch 193, the lead 213, and the magnet 214, and thence to the negative side, i. e., lead 196.

The energization of the magnet 214 rocks the lever arm 210 of the normally closed switch 204 in switch closing direction against the action of the spring 211 while the spring 215 functions to swing the latch 209 beneath the end of the switch lever 210 to retain the same in switch closed position.

It will be understood that as soon as the operation of the motor 138 in the reverse direction is started the end thrust of the worm is relieved and the pressure on the Sylphon 161 stops, whereupon the microswitch 185 is opened, thus breaking the circuit through the magnet 208 and freeing the latch 209 to be moved into latching position by its spring 215. In other words, the deenergization of the magnet 208 occurs simultaneously with the energization of the magnet 214.

It will be understood that the reverse operation of the motor releases the chuck jaws from the work piece with the usual hammer blow previously referred to and that such operation of the motor is continued until the jaws have been moved outwardly sufficiently far to permit the work piece to be unloaded, at which time the operator releases the hand grip 134 and the switch 193 opens and rocks said hand grip 134 to the position indicated in Fig. 18, whereupon the reverse operation of the motor is terminated.

It will also be noted that the operator, if he finds that the jaws have not been opened sufficiently far for unloading or because of some other reason, can again rock the hand grip 134 to close the switch 193 and continue the reverse rotation of the motor and a further opening movement of the jaws.

It will also be understood that, when the jaws have been moved into work gripping position with the predetermined gripping pressure on the work piece, the operator cannot continue the gripping movement of the jaws by retaining the switch 191 closed since, as soon as the predetermined gripping pressure has been arrived at, the microswitch 185 is closed and the normally closed switch 204 is opened and remains open until operation of the motor 138 is reversed. The arrangement described provides a safety feature since whenever the torque reaches a predetermined point the motor is cut out, thus preventing injury to the work piece through too great pressure or injury to the chuck or machine if operating faults or breakage occur therein.

In order to clarify the operation of the mechanism shown in Figs. 16 to 27 inclusive, the following resumé is set forth:

Assuming that the operator has set the hand 171 to the desired gripping pressure on the work piece of the chuck jaws when operating for external gripping and that the reversal switch 197 is closed in the proper manner and as shown and the knob 149 has been turned to prevent rocking movement of the lever 144 during the jaw opening or releasing operation, the operator pulls the hand grip 134 outwardly to engage the wrench 116 in a socket 115 to hold the chuck and work spindle against rotation until the work piece has been loaded in the chuck. He then loads a work piece in the chuck and rocks the hand grip 134 to bring the pointer 188 into cooperation with the word "Close" on the indicator housing. This starts the operation of the motor 138 in the chuck closing direction and drives the wrench spindle 117 to turn the wrench and operate the chuck in jaw closing direction, it being remembered that the rocking of the hand grip closes the switch 191.

When the jaws have engaged the work and are exerting pressure thereon, the worm 135 moves under the end thrust to rock the lever 144 and compress the Sylphons 157 and 161 to move the indicating hand 166 across the dial to indicate the pressure of the jaws on the work piece. When the pressure increases to the pressure shown by the hand 171, i. e., the preselected pressure, the compression of the Sylphon 161 has brought the arm 165 of the stiff wire into engagement with the spring contact 186 of the microswitch 185 and has closed said switch which immediately and automatically opens the normally closed switch 204 to interrupt the current to the motor 138 and stop the latter, whereupon the operator can release the hand grip 134 and the switch 191 automatically opens and rocks the hand grip to the vertical position shown in Fig. 18, after which the operator pushes the hand grip 134 inwardly to the position shown in Fig. 16 to withdraw the wrench 116 from the socket 115. At this time the work spindle and chuck can be rotated so that a machining operation can be performed upon the work piece.

As soon as the machining operation has been completed and it is desired to unload the finished work piece from the chuck, the operator again pulls the hand grip 134 outwardly and engages the wrench 116 in the socket 115. He then rocks the hand grip to bring the pointer 188 into cooperation with the word "Open" on the indicator housing and to close the normally open switch 193, with the result that the motor 138 operates in the reverse direction and through its driving connection with the wrench 116 operates the chuck with a hammer blow to release the jaws.

Immediately that the motor 138 commences to operate in the reverse direction the end thrust on the worm 135 is relieved and the pressure on the Sylphon 161 released, with the result that the microswitch 185 opens to restore the normally closed switch 204 and the parts associated therewith to their original relationship. At this time also the hand 166 moves back to zero. The operator holds the hand grip 134 in the rocked position for opening the chuck until the jaws have disengaged from the work and have moved outwardly the desired distance. The operator, prior to unloading the finished work piece after the jaws have been released, may push the hand grip 134 inwardly if he so desires, or he may leave the hand grip in the outer position to which he had previously pulled it and maintain the wrench in engagement with the socket 115 for closing the chuck when a new work piece has been inserted therein.

In Figs. 28 to 31, inclusive the torque measuring device embodying the invention is illustrated as applied to the slide of a machine tool for measuring the torque in the mechanical feed train for the slide and, in turn, the pressure exerted on the slide and the tools carried thereby to feed the tools relative to the work. As examples of slides with which the device may be used, a cross slide and cross slide carriage are shown.

The bed of a machine tool is indicated at 216 and, as will be well understood, this bed is provided with longitudinally extending ways upon which moves the cross slide carriage 217. The cross slide is indicated at 218 and moves on a way formed on the cross slide carriage and transversely to the ways of the bed as is well known in the art.

The carriage 217 is provided with an apron 219 depending in front of the bed and in which apron are mounted the feed drive trains for the carriage and the cross slide.

In order to illustrate as simple an arrangement of drive or feed trains in the apron as possible, the source of power for the trains is shown as an electric motor 220 carried directly by the apron. Also the gearing constituting the drive trains is illustrated as consisting of a simplified form and is illustrated in Fig. 30 in a developed form.

It will be understood that the power source for driving the drive or feed trains and moving the slides can be other than an electric motor and that the gearing forming the trains may take various forms.

A spindle 221 operatively connected with the motor 220 has secured to it an elongated pinion 222 which meshes with a gear 223 fixed to a worm shaft 224. The worm shaft 224 at its right-hand end as viewed in Fig. 28 is rotatably supported in a bearing boss formed in a part of the apron and said shaft can have limited endwise movement in said bearing boss.

The left-hand end of the worm shaft 224 is supported in an anti-friction thrust bearing 225 the inner race of which is carried by the shaft while the outer race is carried by a bearing housing 226 that is mounted for sliding movement in the end wall of the apron and has a forked portion 227 extending into an indicator housing 228. The worm shaft 224 is provided with a pair of axially spaced worms 229 and 230 which mesh, respectively, with worm wheels 231 and 232.

The worm wheels 231 and 232 are directly mounted on and secured to flanged hub members 235 and 236 which, in turn, are directly and freely rotatable on the shafts 233 and 234. The hub members 235 and 236 at their front ends are provided with clutch teeth 237 which can be interengaged with clutch teeth 238 formed on the inner ends of similar clutch members 239 which are splined to the shafts 233 and 234, respectively.

The clutch members 239 are provided with annular grooves 240 into which extend the opposite ends of a double armed operating lever 241 the hub of which is rockably mounted on a vertically extending pin 242 located intermediate the clutch members 239 and supported by the front wall of the apron. The operating lever is also provided with an operating handle 243 integral with the hub and projecting horizontally through the front wall of the apron to a position convenient of access for the operator. It will be seen that the operator, by rocking the operating handle 243 in a horizontal plane from the full line position of Fig. 30 to either dash line position of said figure, can selectively interengage the clutch teeth 238 of either clutch member with the clutch teeth 237 of the cooperating hub members 235 and 236 to clutch the worm wheel 232 to the shaft 234 or the worm wheel 231 to the shaft 233. It will be understood that suitable spring points are provided for holding the operating handle 243 in its neutral position and also in either of its two operative positions as is well known in the art.

The hub member 236 rearwardly of the worm wheel 231 is provided with gear teeth 244 which mesh with an idler gear 245 rotatable on a shaft 246 supported in the apron. The idler gear 245 is in mesh with an elongated pinion 247 which is fixed to a screw shaft 248 carried by the carriage and cooperating with a nut fixed to the cross slide for moving the cross slide 218. The shaft 234 has secured to its inner end a rack pinion 249 which meshes with a fixed rack 250 extending longitudinally of the bed, wherefore rotation of the shaft 234 imparts longitudinal movement to the cross slide carriage 217 along the bed.

It will be seen that if either the worm wheel 231 or the worm wheel 232 is clutched to its respective shaft 233 or 234, end thrust is exerted on the worm shaft 224 through either the worm 229 or the worm 230. This end thrust on the shaft 224 moves the shaft, worms, and bearing housing 226 in an axial direction. As already stated, the bearing housing 226 is provided with a slotted portion projecting into the indicator housing 228 and this portion straddles a lever arm 251 which is pivoted at its lower end in the indicator housing as shown at 252.

A pin is carried by the slotted portion of the bearing housing 226 and is provided with a shoe 253 engaging in a vertically elongated slot 254 formed in the lever arm 251, and this shoe imparts rocking movement to said lever arm when said bearing housing moves axially under the above mentioned end thrust on either of the worms.

The upper end of the lever arm 251 is provided with a camming V-notch or recess 255 having symmetrical steep angled sides which engage with a roller 256 carried by an arm 257 which is rockably supported at one end by the end wall of the apron, as indicated at 258. It will be understood that as the angle of the sides of the camming recess becomes steeper through rocking of the lever arm 251, greater pressures are required for rocking said arm.

The arm 257 directly above the roller 256 is connected to a Sylphon 259 that is supported by and depends from the top wall of the indicator housing 228. The Sylphon 259 is connected by a conduit 260 with a second Sylphon in housing 261, see Fig. 29, and corresponding to the Sylphon 161 shown in Fig. 27.

In order to simplify the description and avoid repetition reference is now made to Figs. 25, 26, and 27 which illustrate identical parts to those contained in the indicator housing 228, with the exception that in place of a slidable and rockable rod 133 only a rockable rod 262 is mounted in the housing 228 for rocking the switch operating member 189. The rod 262 extends outwardly of the side of the indicator housing 228 and has fixed thereto an operating lever 263 provided at its end with a pull pin handle 264 well known in the art, the pin of which handle can be positioned in any one of three recesses 265 formed in the wall of the indicator housing to retain the lever arm 263, rod 262 and switch operating member 189 in a neutral position or in either one of two operative positions, as indicated in dash lines.

It will be understood that rocking of the rod 262 from a neutral or inoperative position in one direction closes the normally open switch 191, while rocking said arm in the opposite direction closes the normally open switch 193.

It will also be understood that the Sylphon 261 in housing includes the rod 163 and the stiff wire which has the downwardly depending arm 165 and the angular arm 164. In addition, it will be understood that the front face of the indicator housing 228 is provided with a window like the window 169 which is in register with an indicating dial such as the dial 170.

It will be understood further that the angular arm 164 of the stiff wire is operatively connected to an indicating hand 166. Likewise it will be understood that the indicator housing 228 contains plates 173 and 179 which can be moved by the knob 266 projecting from the front of the indicating housing 228 and corresponding to the knob 184 for the purpose of setting the normally stationary hand 171 in predetermined position with respect to the dial, and also for the purpose of adjusting the microswitch 185 relative to the downwardly extending arm 165 of the stiff wire carried by the pin 163 of the Sylphon 161.

The normally stationary hand 171 in this instance is set to a predetermined pressure in excess of the normal or correct feeding pressures applied to the carriage or cross slide. The setting of the hand 171 is accomplished, as already stated, by the knob 266, and such setting also adjusts the microswitch 185 carried by the plate 179 in relationship to the downwardly extending arm 165 of the stiff wire.

The plate 179 can be adjusted relative to the plate 173 by means of the adjusting screw 177 to slightly vary the location of the microswitch in order to facilitate assembly, as already set forth. It will be understood that the motor 220 is connected in a circuit as shown in the diagram of Fig. 24.

It will be appreciated that the operation of the motor 220 is controlled in the same way as is the operation of the motor 138 shown in Fig. 24 and that when the indicating hand 166 moves across the dial and coincides with the set hand 171 the microswitch 185 is closed and the motor 220 deenergized.

It is not believed necessary to explain in greater detail the mode of operation of the switches which control the motor 220 since this explanation has been fully set forth relative to the motor 138 by reference to the wiring diagram of Fig. 24.

Assuming that the operator wishes to impart feeding movement to the cross slide carriage, he first pulls out the pull handle 264 and rocks the rod 262 to close the switch 191 and start the operation of the motor 220. The worm shaft 224 and the worms 229 and 230 are now rotating, whereupon the operator rocks the operating handle 243 to the left to engage the teeth 238 of the clutch member 239 with the teeth 237 of the flanged hub member 235 to thus connect the worm wheel 232 with the shaft 234 and rotate the latter, whereupon longitudinal movement is imparted to the cross slide carriage.

As the cross slide carriage moves and the cutting tools carried thereby engage with the work piece, the worm shaft 224 is subjected to end thrust and such end thrust is transmitted to the lever arm 251 and rocks the latter to cause compression of the Sylphon 259 and the Sylphon in housing 261 with a resultant movement of the indicating hand 166 from zero across the dial 170 toward the hand 171 which had been previously set slightly in excess of the correct or maximum feeding pressure to be exerted on the cross slide carriage.

During the feeding operation, the indicating hand 166 should not quite attain the position of the set hand 171 and will indicate the actual feeding pressure exerted on the cross slide carriage which pressure will be less than the pressure at which the hand 171 is set. However, when the feeding operation of the tool relative to the work piece is completed and the cross slide carriage engages the usual fixed limit stop, such as an adjustable screw carried by a stop roll, as is well known in the art, the movement of the carriage and tool stops but the pressure on the carriage increases, thus causing additional end thrust on the worm 230 and worm shaft 224 and further compressing the Sylphons and moving the hand 166 into registry with the set hand 171, at which moment the microswitch 185 is closed and the motor 220 is deenergized. The engagement of the carriage with the fixed limit stop starts the period of dwell for the tool, and during the dwell the deenergization of the motor 220 occurs when the pressure on the carriage reaches that indicated by the set hand 171.

It will be seen that during the initial part of the dwell the pressure on the slide builds up to the predetermined pressure while during the remainder of the dwell the predetermined pressure remains uniform on the slide due to the locking angle of the worms and worm wheels, thus always maintaining the tool in engagement with the work during the dwell at the uniform predetermined pressure. This enables many like work pieces to be machined uniformly within close tolerances. This is in contradistinction to the usual method wherein the power feed of a slide is terminated by the disengagement of the feed control lever after which the operator manually effects the further movement of the slide until it engages with a fixed stop, it being evident that such further manual movement of the slide is subject to a wide range of variations in the manually exerted pressure. The variations in the manual pressures just referred to result in nonuniform termination of the cuts on the work pieces and this is a great handicap in certain machining operations, such as sizing the work pieces or machining shoulders on the work pieces.

After the motor 220 has stopped its operation and the dwell period has terminated, the operator withdraws the pull pin handle 264 and rocks the lever 263 to rock the shaft 262, allowing the switch 191 to open and causing the switch 193 to close, whereupon the motor 220 commences to operate in the reverse direction and the cross slide carriage moves longitudinally of the bed away from the work piece.

It will be recalled that the reversing of the motor 138 restores the original relationship of the operative control parts in the circuit as described in connection with Fig. 24, and the same thing is true in the reversal of the operation of the motor 220. It will also be understood that the worm shaft 224 now rotates in the reverse direction.

When the cross slide carriage has traveled in the reverse direction the proper distance, the operator withdraws the pull handle 264 and rocks the lever 263 to neutral or inoperative position to stop the operation of the motor 220, or, if he wishes to take a second cut, he immediately rocks the lever 263 to permit the switch 193 to open and to close the switch 191 to again start the operation of the motor 220 and the worm shaft 224 in the forward direction.

It will also be understood that when the cross slide 218 is being fed the same mode of operation is followed except that the operator rocks the operating handle 243 to engage the clutch teeth 238 of the clutch member 239 on the shaft 233 with their cooperating clutch teeth 237 formed on the hub member 244, whereupon the worm wheel 231 is operatively connected to the shaft 233 and to the cross slide screw 248. Of course, the operator adjusts the indicator for the pressure desired on the cross slide.

It will be understood that the indicator will function irrespective of whether the feeding movement of the slides is in one direction or the other since the end thrust on the worms and the worm shaft 224 will rock the lever 251 in either direction.

It will be noted that the V-notch 255 in the upper end of the lever is symmetrical and will compress the Sylphon 259 in the same manner and degree irrespective of the direction of rocking movement that is imparted to the lever arm 251. The embodiment of the invention just described constitutes a safety device since, if any stoppage or breakage occurs in the gear trains or other parts in the apron or slides, the pressure builds up to the predetermined pressure and stops the operation of the motor 220.

From the foregoing description of various embodiments of the invention, it will have been seen that such embodiments can be operatively associated with the mechanical train that applies operating force or torque to a movable part of a machine tool to indicate visibly and directly to the operator the degree of force applied to such part. Likewise it will have been seen that the various embodiments of the invention, when operatively associated with the mechanical train that applies force or torque to the work holding means of a machine tool or to the tool carrying means thereof, will indicate visibly and directly to the operator the pressures with which the work is gripped or held or the pressures applied to the tool carrying means in causing the tools to be fed relative to the work.

It will have been seen further that the embodiments of the invention include a movable indicating element together with means for maintaining said element in pressure indicating position throughout the period that force or pressure is being applied to the movable part, work holding or tool carrying means of the machine tool.

Furthermore, with reference to the embodiment illustrated in Figs. 1 to 15 inclusive, means is provided for locking the indicating element against movement in any direction and to thus maintain said element in the indicating position so long as the work holding means is holding or gripping the work even though the force or torque applying train to the work holding means has ceased to function.

In addition, it will be noted that certain of the embodiments include means presettable to effect a discontinuance of the transmission of force or torque through the operating train to the movable part of a machine tool when the pressure or force applied thereby attains to a predetermined force or pressure.

Furthermore, it should be noted that the application of force or pressure to the movable part, i. e., the chuck or slide, is initiated manually by the closing of a switch but is automatically terminated by the opening of a switch when the pressure has attained to the predetermined amount.

Furthermore, in connection with the last described embodiment, the indicating hand of the device is preset to a predetermined pressure slightly in excess of the required force or feeding pressure to be applied to the tool carrying means, wherefore the discontinuance of the transmission of force or torque by the mechanical train does not occur until the required force or feed pressure is exceeded and the predetermined force or feeding pressure has been reached.

Additionally, it will have been seen that the operative association of a device embodying the invention with the mechanical force or torque applying train to a movable part of a machine tool improves the efficiency, accuracy, and facility of operation of the machine tool and obviates the likelihood of damaging such part or the work piece or the mechanism of the machine tool because of the application of too heavy forces on such part or too heavy or too light gripping pressures on the work piece or continuing the operation of the machine tool after breakage or abnormal stoppage of the operative parts thereof.

It will be understood that it is within the contemplation of the present invention that the force applied by the mechanical operating train may be of other forms than torque, as, for example, lineal pressure.

Although a number of embodiments of the invention have been illustrated and described herein, it will have been understood that the invention is susceptible of various modifications and adaptations within the scope of the appended claims.

Having thus described my invention, I claim:

1. A machine tool having a movable part, a train for applying operating force to said part and including a member movable by thrust thereon, and means operatively associated with said member for indicating visibly and directly in terms of pressure the force applied to said part and including a fluid pressure responsive compressible means, a shiftable element acting on said compressible means and a camming element acting on said shiftable element and operatively associated with said movable member and having a camming surface of predetermined configuration cooperating with a portion of said shiftable element, said compressible means and the relationship between said elements and said camming surface and said cooperating portion being such that for equal successive increments of compression of said compressible means and for equal successive increments of shifting movement of said shiftable element increasing successive increments of pressure are required on said camming element.

2. A machine tool having a movable part, a train for applying operating force to said part and including a member movable under thrust, an indicating device, and operative connections between said device and said member for operating the device in correlation to varying thrusts on said member and including a Sylphon operatively connected to said device, and a camming member operatively connected with said Sylphon and with said first named member and having a camming surface of predetermined contour for translating the movement of said movable member into compression of said Sylphon.

3. A machine tool having a movable part, a train for applying operating force to said part and including a member movable under thrust, an indicating device, and operative connections between said device and said member to operate said device in correlation to varying thrusts on said member and including a Sylphon operatively connected with said device, a second Sylphon in series with said first named Sylphon, and a camming element operatively associated with said second Sylphon and with said member and having a camming surface of predetermined contour for translating the movement of said movable member into compression of said Sylphon.

4. A machine tool having a movable part, a mechanical drive train for applying operating torque to said part, a device for indicating the force applied to said part by said train, and operative connections between said device and said train for operating the device in correlation to the varying degrees of torque exerted by said train and including a Sylphon operatively connected to said device and a camming member operatively connected with said Sylphon and with said train and having a camming surface of predetermined contour, said camming member being movable by said train to exert compressive force on said Sylphon.

5. A machine tool having a movable part, a mechanical drive train for applying operating torque to said part and including a member movable under end thrust, a device for indicating the force applied to said part by said train, and operative connections between said device and said train to operate said device in correlation to varying degrees of torque exerted by said train and including a Sylphon operatively connected with said device, a second Sylphon in series with said first-named Sylphon and a camming element operatively associated with said second Sylphon and with said member and having a camming surface of predetermined contour, said camming element being movable by the movement of said member under end thrust to exert compressive force on said Sylphon.

6. A machine tool having a movable part, a train for applying force to said part to move the same, a device operatively connected with said train for indicating the force applied to said part and including a movable indicating element, means operatively associated with said device and functioning automatically to lock said element in the force-indicating position to which it has been moved, and means operatively connecting said last means and said train and acting at a predetermined point in the operation of the latter to automatically release said last means.

7. A machine tool having a movable part, a train for applying force to said part to move the same, a device for indicating the force applied to said part and including a movable indicating element, means operatively connecting said device and said train, means for locking said element in the force-indicating position to which it has been moved, and means operatively connecting said locking means and said train for actuating said locking means automatically at a predetermined point in the operation of said train.

8. A machine tool having a movable part, a train for applying force to said part to move the same, a device for indicating the force applied to said part and including a movable indicating element, means for locking said element in the force-indicating position to which it has been moved, and means movable in timed relation to said train and operatively connected with said locking means for controlling movement of the latter to locking and unlocking positions.

9. In a machine tool, in combination, a chuck, a mechanical train operatively associated with said chuck and having a cycle of operation during which said chuck is actuated to gripping position and a cycle of operation during which said chuck is actuated to non-gripping position, a device for indicating the gripping force of said chuck and including a movable indicating element, means operatively connecting said device and said train and responsive to the force applied to the chuck by said train during its first named cycle of operation, means for locking said element in the position to which it has been moved during the gripping actuation of the chuck, and means operatively associated with said train and said last named means for restoring the latter to inactive position during the second named cycle of operation of said train.

10. In a machine tool, in combination, a chuck, means for actuating said chuck to gripping and released positions, a power source, a mechanical drive train operatively associated with said actuating means, a clutch for connecting and disconnecting said power source and train, a control means operatively associated with said clutch and manually operable for engaging the same, means operatively associated with said train and said control means and operating in timed relation with the former for automatically operating said control means to effect a disengagement of said clutch after a predetermined period of engagement thereof, a device operatively associated with said train and including a movable indicating element for indicating the force applied by said train to said chuck actuating means, and means operatively associated with said device and said train and including elements operating in timed relation with said train for locking said indicating element in the indicating position to which it has been moved during one period of operation of said train and for releasing said indicating element during the next succeeding period of operation of said train.

11. A machine tool having a chuck of the swinging jaw type, a train for applying force to said jaws to swing the same and including a member movable by thrust thereon, and means operatively associated with said member for indicating visibly and directly the degree of force applied by said train to swing said jaws and including a shiftable element and a camming element acting on said shiftable element and having a camming surface such that equal and successive increments of shifting movement imparted to said shiftable element by said camming element require increasing successive increments of pressure on said camming element.

12. A machine tool having a chuck of the swinging jaw type, a train for applying force to said chuck to swing the jaws thereof and including a motion transmitting element movable under thrust thereon, a power source, means for mechanically connecting and disconnecting said power source to and from said train, means automatically actuating said last named means to disconnect said power source from said train after they have been connected for a predetermined period, a device for indicating the force applied to said chuck, and means operatively associating said device and said element of said train for actuating said device in response to the movements of said element under thrust.

13. A machine tool having a chuck of the swinging jaw type, a train for applying force to said chuck to swing the jaws thereof, a device for indicating the force applied to said chuck and including a movable indicating element, means for locking said element in the force indicating position to which it has been moved, and means movable in timed relation to said train and operatively connected with said locking means for controlling movement of the latter to locking and unlocking positions.

14. A machine tool having a chuck of the slidable jaw type, a train for applying operating force to said chuck to slide the jaws thereof and including a member movable by thrust thereon, and means operatively associated with said member for indicating visibly and directly the degree of force applied to said chuck to slide the jaws thereof and including a shiftable element and a camming element having a relationship such that equal and successive increments of shifting movement imparted to said shiftable element by said camming element require increasing successive increments of pressure on said camming element.

15. A machine tool having a chuck of the sliding jaw type, a mechanical drive train for applying operating torque to said chuck to slide the jaws thereof and including a member movable under end thrust, a device for indicating the force applied to said chuck by said train, and operative connections between said device and said train to operate said device in correlation to varying degrees of torque exerted by said train and including a Sylphon operatively connected with said device, a second Sylphon in series with said first named Sylphon, a lever operatively associated with said member and having a camming portion, and a second lever operatively associated with said camming portion and said second Sylphon.

16. In a machine tool a chuck having movable jaws capable of gripping a work piece internally or externally, a mechanical train operatively associated with said chuck for applying operating force thereto to move the jaws thereof, said train including a member shiftable under thrust, an indicating device for indicating the force applied by said train to said chuck to actuate the jaws thereof, operative connections between said device and said member and responsive to the shifting movements of the latter under thrust, and means operatively associated with said operative connections for selectively holding said connections stationary to prevent shifting movement of said member under thrust during chuck opening operation of the train, wherefore said indicating device will selectively function for either internal of external gripping of the work piece by the chuck jaws.

17. A machine tool having a movable part, a train for applying operating force to said part and including a member movable axially under thrust, a movable member having a camming surface of predetermined contour, operative connections between said members to effect movement of the second member upon axial movement of the first member, a rockable element operatively associated with the camming surface of said second member and rocked thereby upon movement of said second member, a fluid pressure producing means actuated by said element, and an indicating device operatively associated with said last means and actuated thereby.

18. A machine tool having a movable part, a mechanical train for applying operating force to said part and including a worm axially shiftable under end thrust, a movable member having a camming surface of predetermined contour, operative connections between said worm and member to move the latter upon axial shifting of said worm, a rockable element having a portion contacting said camming surface wherefore said element is rocked upon movement of said member, a fluid pressure producing means operatively associated with and actuated by said element, and an indicating device operatively associated with said last means and actuated thereby.

19. A machine tool having a movable part, a mechanical train for applying operating force to said part and including a worm movable by end thrust thereon, a bearing for said worm and movable with the latter under end thrust, a movable member having a camming surface of predetermined contour, operative connections between said bearing and said member, a movable element having a portion contacting said camming surface wherefore said element is moved upon movement of said member, a fluid pressure producing means operatively associated with and actuated by said element, and an indicating device operatively associated with said last means and actuated thereby.

20. A machine tool having a movable part, a mechanical train for applying operating force to said part and including a worm movable axially by end thrust thereon, a bearing for said worm and movable therewith under end thrust, a movable member having a camming surface of predetermined contour, operative connections between said member and said bearing, a movable element having a roller engaged by said camming surface, wherefore movement of said member moves said element, a Sylphon operatively associated with said element and compressed thereby when moved in one direction, a second Sylphon, operative connections between said Sylphons for effecting compression of the second Sylphon upon compression of the first Sylphon, and an indicating device operatively associated with said second Sylphon and actuated thereby.

FRED H. BOGART.